US008566142B2

(12) United States Patent
McCarney et al.

(10) Patent No.: US 8,566,142 B2
(45) Date of Patent: Oct. 22, 2013

(54) COMPUTER IMPLEMENTED METHODS AND SYSTEMS OF DETERMINING MATCHES BETWEEN SEARCHERS AND PROVIDERS

(75) Inventors: Paul McCarney, Clonarf (AU); Andrew Jessup, Pyrmont (AU)

(73) Assignee: Quotify Technology, Inc., Oakland, CA (US)

( * ) Notice: Subject to any disclaimer, the term of this patent is extended or adjusted under 35 U.S.C. 154(b) by 0 days.

(21) Appl. No.: 13/057,119

(22) PCT Filed: Aug. 14, 2009

(86) PCT No.: PCT/IB2009/006540
§ 371 (c)(1),
(2), (4) Date: Feb. 1, 2011

(87) PCT Pub. No.: WO2010/018450
PCT Pub. Date: Feb. 18, 2010

(65) Prior Publication Data
US 2011/0145039 A1 Jun. 16, 2011

Related U.S. Application Data

(60) Provisional application No. 61/089,002, filed on Aug. 14, 2008, provisional application No. 61/110,935, filed on Nov. 3, 2008.

(51) Int. Cl.
*G06F 17/00* (2006.01)
(52) U.S. Cl.
USPC ..................................................... 705/7.29
(58) Field of Classification Search
USPC ........................................................ 705/7.29
See application file for complete search history.

(56) References Cited

U.S. PATENT DOCUMENTS

| 5,592,375 | A | 1/1997 | Salmon et al. |
| 6,463,431 | B1 | 10/2002 | Schmitt |
| 6,708,174 | B1 | 3/2004 | Tenorio |
| 6,826,541 | B1 | 11/2004 | Johnston et al. |
| 6,950,801 | B2 | 9/2005 | Brookes et al. |

(Continued)

FOREIGN PATENT DOCUMENTS

WO  WO03017131 A1  2/2003

OTHER PUBLICATIONS

PCT Search Report and Written Opinion dated Nov. 30, 2009 for PCT International Patent Application No. PCT/IB2009/006541, filed Aug. 14, 2009; 11 pages total.

(Continued)

*Primary Examiner* — Thomas Dixon
(74) *Attorney, Agent, or Firm* — Ganz Law, P.C.

(57) ABSTRACT

The inventive subject matter is generally directed to matching a party with another party based on profiling of the parties, and optionally an industry category, for parameters that are relevant to making a match. In certain embodiments, the inventive subject matter facilitates matches between searchers and service providers based on assignment of searchers and service providers to predefined Buyer Types or Service Provider Types based on questionnaires, surveys, and other input and feedback mechanisms. In a further aspect, the inventive subject matter is directed to a system for valuing and monetizing a set of leads to offer to a party. In some embodiments, the inventive subject matter is directed to mobile applications for matching searchers with providers based on awareness of the locations of the parties.

27 Claims, 38 Drawing Sheets

(56) References Cited

U.S. PATENT DOCUMENTS

| | | | |
|---|---|---|---|
| 6,983,276 | B2 | 1/2006 | Tenorio |
| 7,071,842 | B1 | 7/2006 | Brady |
| 2001/0039508 | A1 | 11/2001 | Nagler et al. |
| 2001/0056396 | A1 | 12/2001 | Goino |
| 2003/0009360 | A1* | 1/2003 | Chaudhary et al. ............... 705/5 |
| 2003/0182191 | A1 | 9/2003 | Oliver et al. |
| 2005/0091118 | A1* | 4/2005 | Fano ............................. 705/26 |
| 2005/0149410 | A1 | 7/2005 | Livesay |
| 2005/0177614 | A1 | 8/2005 | Bourne |
| 2006/0265268 | A1 | 11/2006 | Hyder et al. |
| 2007/0112636 | A1 | 5/2007 | Lucker, Jr. |
| 2007/0192130 | A1 | 8/2007 | Sandhu |

OTHER PUBLICATIONS

PCT Search Report and Written Opinion dated Jan. 15, 2010 for PCT International Patent Application No. PCT/IB2009/006540, filed Aug. 14, 2009; 9 pages total.

Examination Report issued by the Australian Patent Office for Australia patent application No. 2009280919, dated Apr. 17, 2012, 2 pages.

Examination Report issued by the Australian Patent Office for Australia patent application No. 2009280920, dated Jun. 26, 2012, 3 pages.

Sumo webpage; obtained May 14, 2013, from http://sumosuccess.wordpress.com/2008/01/10/kolbe-index-what-does-it-do-for-you/; 3 pages.

Kolbe webpage; obtained May 14, 2013, from http://www.kolbe.com; 1 page.

Snap webpage; obtained May 14, 2013, from http://www.snap.com/; 2 pages.

Kontera webpage; obtained May 14, 2013, from http://www.kontera.com; 3 pages.

Apple webpage; obtained May 14, 2013, from http://appleinsider.com/articles/08/07/31/apple_seeds_developer_tools_for_background_conscious_iphone_apps.html; 3 pages.

O'Reilly webpage; obtained May 14, 2013, from http://whereconf.com/where2008/public/content/home; 1 page.

Columbia webpage; obtained May 15, 2013 from http://web.archive.org/web/20070205183558/http://www.columbia.edu/~ss957/nytimes.html; 3 pages.

VideoEgg webpage; obtained May 15, 2013, from web.archive.org/web/20081017135857/http://www.videoegg.com/; 1 page.

Non-final Office Action dated Jun. 19, 2013, for U.S. Appl. No. 13/057,086, 16 pages.

* cited by examiner

FIGURE 3--DATA FLOW SUMMARY (DFS)

Home > About us

Finding the right Finance Professional is easy with Quotify.

1. Complete the short profile below.
2. Get instantly matched with the best suppliers for your specific needs.
3. Receive free no-obligation estimates. Hire the supplier of your choice!

Finance Professionals
Join Here

1301 Project Details

Do you require services for an individual or a business? Required

⦿ Individual
◯ Business

What type of service do you require? Required

◯ Financial Planning - Wealth Management, Super, Insurance, Retirement planning
◯ Tax Accounting - Tax returns, Budgeting, Tax planning, Salary packaging
1302 ◯ Budgeting and Debt Management - Reducing debt, creating budgets and savings plans
◯ Home Loan - Mortgages, loans for property investment

Figure 13

Quotify

Get Matched with Finance Professionals Now

Home > About us

Finding the right Finance Professional is easy with Quotify.

1. Complete the short profile below.
2. Get instantly matched with the best suppliers for your specific needs.
3. Receive free no-obligation estimates. Hire the supplier of your choice!

Finance Professionals
Join Here

Project Details

Do you require services for an individual or a business? Required

1301 — ○ Individual
● Business

What type of service does your business require? Required

1402 — ○ Accountant - Starting a business, Tax planning & returns, Business plan, BAS lodgment, Auditing
○ Bookkeeping - BAS preparation, Accounts payable & receivable, Payroll, Data entry
○ Business Advisor - Buying or selling a business, Financial analysis, Turnarounds

Figure 14

Job Location Required

The suburb or postcode where the service is required.

1601 —

[                    ]

When would you like your security system installed? Required

[      ▼]

If an onsite inspection is required, when would be the best time for this? Required Most quality security companies will need to do an onsite inspection in order to give you an accurate quote.

[Early Afternoon (12-3pm) ▼]

What type of video surveillance system are you interested in? Required

○ No preference - please advice me
○ Digital (DVR)
○ Analogue (VCR)
○ Other [                    ]

Approximately how many cameras do you need for your system? Required

[      ▼]

Where will the cameras be located? Required

[         ▼]

Other than price, what is most important to you when selecting a CCTV system?

☐ Features and Functionality
☐ Service (installation, training and support)
☐ Ease of use (User friendliness)
☐ Scalability
☐ System Reliability
☐ Other [                    ]

What additional security products are you interested in?

[            ▼]

Please describe any special features or additional requirements for this?

Contact Information

Why we need your contact information

| Field | Note |
|---|---|
| Email Address: | Required |
| | Your privacy is important to us. The Quotify Network does not rent or sell your personal details to third parties without your consent. |
| Create a Password: | Required |
| First Name: | Required |
| Last Name: | Required |
| Your Address: | |
| Suburb: | |
| Postcode: | Required |
| Day Time Phone: | Required |
| | Why we need your phone number |
| Mobile: | |
| Best Contact Time: | Required |

1702 — ☐ I acknowledge and agree to Quotify's Terms & Conditions and to receiving communications from Quotify Required You're almost done! If you have answered all of the required questions above, click the "Submit" button below to finish and send your request.

Submit

Figure 17

Carpet Cleaning
Status - active

Vertical Details  Question Usage  Channel Usage  Price Points
Vertical
Name  * Carpet Cleaning  Deactivate
Please enter the name of your vertical.

| MATCH RULES | | |
|---|---|---|
| Id | Name | Description |

Match Rules are pluggable business rules used during the registration process to determine which providers are suitable for matching. Each Vertical should ha matching to work correctly.

☑ 9  Lep_Match_BackfillDefault   Default Backfill filter rule. Filters only on location.

☐ 10 Lep_Match_BackfillRemovals  Removals Backfill filter rule. Filters on PickUp Location Or Drop-off location.

☑ 1  Lep_Match_Cap               Filter out providers based on their daily, weekly and monthly lead caps ☑ 6  Lep_Match_JobLocation       Filter out providers who don't service the specified job location. To be used for verticals which can have only one job location

Figure 21

Carpet Cleaning
Status - active

| Vertical Details | Question Usage | Channel Usage | Price Points |
|---|---|---|---|

| ATTACHED QUESTIONS | |
|---|---|
| Code | Label |
| QST378 | What type of property do you require carpet cleaning for? |
| QST379 | What cleaning do you require? |
| QST380 | How many standard sized rooms do you want cleaned? |
| QST381 | How many hallways do you want cleaned? |
| QST382 | Approximately how many stairs are to be cleaned? |
| QST383 | What type of carpet do you have? |
| QST384 | When would you like the job done? |
| QST385 | Do you own or rent the home being cleaned? |
| QST386 | Do you have a preference for a type of carpet cleaning? |
| QST387 | Please describe any special features or additional requirements for this? |
| QST388 | Are there any other services you might require? |
| QST389 | How many seats in total, do you want cleaned? |

Figure 22

How many standard sized rooms do you want cleaned?
Status - active

| Question Details | Options | Tags | Channel Usage | Profile Rules |
|---|---|---|---|---|

Code  QST380

Label  ★ How many standard sized rooms do you want cleane  [Deactivate]

Type  ★ select

Mandatory  ★ ●Yes ○No

Vertical  Carpet Cleaning

Description  Generally, a second bedroom is standard sized. For larger rooms count these as two rooms This description is viewable by both Consumers and Providers.

Help

Descriptive help text for the consumer. This will be the text for the help url if it is specified.

Help URL

Internal Description

This description is only visible within administration consoles.

Figure 23

Quotify Funerals
Status - active

| Channel Details | Registration Filters |
|---|---|

Channel Name: ★ Quotify Funerals

Application Identity: ★ Quotify Drupal Accounts

A Channel must be assigned to an Application Identity

Channel Group: Quotify

Channel Verticals: ★
- ☐ Bathrooms
- ☐ Carpet Cleaning
- ☐ Catering
- ☐ Cleaning
- ☐ Conveyancing
- ☐ Demolition
- ☐ Fencing
- ☐ Finance
- ☑ Funerals
- ☐ Kitchens
- ☐ Landscaping
- ☐ Painting
- ☐ Pest Control
- ☐ Pool Cleaning

[Verify] [Deactivate] [Preview Saved Changes]

Figure 24

| AVAILABLE QUESTIONS | | | | | | |
|---|---|---|---|---|---|---|
| Code | Vertical | Label | Internal Description | Description | Type | Mandatory |
| QST546 | N/A | Have your suppliers contacted you? | | | radio | 0 |
| QST549 | N/A | Would you like to send a reminder to these companies to get in touch with you? | | | checkbox | 0 |
| QST550 | N/A | Have you finished this job? | | | radio | 0 |
| QST551 | N/A | Who did you choose? | | | radio | 0 |
| QST552 | N/A | Who did you choose? | | | radio | 0 |
| QST553 | N/A | Who did you choose? | | | text | 0 |
| QST554 | N/A | Would you recommend them? | | | radio | 0 |
| QST555 | N/A | Quality | | | rating | 0 |
| QST556 | N/A | Budget | | | rating | 0 |
| QST557 | N/A | Communication | | | rating | 0 |
| QST558 | N/A | Value | | | rating | 0 |
| QST559 | N/A | Timeliness | | | rating | 0 |
| QST560 | N/A | Courteous | | | rating | 0 |
| QST561 | N/A | Cleanliness | | | rating | 0 |

Figure 25

| | Code | Vertical | Label | Internal Description | Description | Type | Default Value | Mandatory | Hide | Page | Sequence | Parent Options |
|---|---|---|---|---|---|---|---|---|---|---|---|---|
| ☐ | QST455 | Funerals | What type of Funera... View Options | | | radio | | Yes | ☐ | 1 | 1 | Set Parents |
| ☐ | QST456 | Funerals | What type of funeral View Options | | | radio | | Yes | ☐ | 1 | 2 | Modify Parents |
| ☐ | QST461 | Funerals | Is the funeral for you View Options | | | select | | Yes | ☐ | 1 | 2 | Modify Parents |
| ☐ | QST457 | Funerals | Would you like a reli... View Options | | | select | | Yes | ☐ | 1 | 3 | Modify Parents |
| ☐ | QST458 | Funerals | Which Postcode or S | | | location | | Yes | ☐ | 1 | 3 | Modify Parents |
| ☐ | QST459 | Funerals | What is your relation View Options | | | radio | | Yes | ☐ | 1 | 4 | Modify Parents |
| ☐ | QST460 | Funerals | Please select any ad | | | checkbox | | | ☐ | 1 | 5 | Modify Parents |

Figure 26

Available Options

QST11 - Best Contact Time
- (OPT6) - Any phone -- any time Use
- (OPT7) - Mobile phone -- any time Use
- (OPT8) - Morning Use
- (OPT9) - Midday Use
- (OPT10) - Evening Use
- (OPT11) - Weekend Use QST548 - Have your suppliers contacted you?
- (OPT1020) - Yes, enough suppliers have contacted me Use
- (OPT1021) - No, I'm still waiting to hear back from someone! Use QST550 - Have you finished this job?
- (OPT1022) - Yes, the job has been completed Use
- (OPT1023) - No, but I've chosen a provider from Quotify Use
- (OPT1024) - No, I chose someone else Use
- (OPT1025) - No, I'm still deciding Use
- (OPT1026) - No, I'm not going ahead with this job Use QST554 - Would you recommend them?
- (OPT1027) - Yes Use
- (OPT1028) - No Use QST456 - What type of funeral service do you require?
- (OPT718) - Burial Service Use
- (OPT719) - Cremation Use
- (OPT720) - Entombed in a Mausoleum Use
- (OPT721) - Repatriation from Overseas Use QST459 - What is your relationship to the deceased?
- (OPT729) - Next of Kin / Family Member Use
- (OPT730) - Executor of the will Use
- (OPT731) - Trustee Use
- (OPT732) - Other: Use

Selected Options

QST455 - What type of Funeral Director service do you require?
- (OPT716) - Funeral Service for Deceased Remove
- (OPT717) - Pre-paid Funeral Plan prior to passing Remove

Figure 27

Bathroom Renovation
Status - active

Profile Group    Profile Rules

| Rules | | | | | | | | | |
|---|---|---|---|---|---|---|---|---|---|
| Id | Type | Target Question | Target Option | Sequence | Dependency | Min | Max | | |
| 1 | equal | (QST1) Renovation Size | (OPT1) Partial Bathroom Renovation... | 0 | 0 | 0 | 0 | Edit Rule / Add Source / Delete Rule | |
| | | Source Question | Source Option | | | | | | |
| | | (QST12) What bathroom renova... | (OPT13) Partial Bathroom Renovation... | Delete Source | | | | | |

| Id | Type | Target Question | Target Option | Sequence | Dependency | Min | Max | | |
|---|---|---|---|---|---|---|---|---|---|
| 2 | equal | (QST1) Renovation Size... | (OPT2) Shower Screens Only... | 0 | 0 | 0 | 0 | Edit Rule / Add Source / Delete Rule | |
| | | Source Question | Source Option | | | | | | |
| | | (QST12) What bathroom renova | (OPT14) Shower Screens Only... | Delete Source | | | | | |

Figure 28

Bathroom Renovation
Status - active

Profile Group    Profile Rules

| Rules | | | |
|---|---|---|---|
| Id | Type | Target Question | Target Option |
| 1 | equal | (QST1) Renovation Size... | (OPT1) Partial Bathroom |
| | | Source Question | Source Option |
| | | (QST12) What bathroom ronova... | (OPT13) Partial Bathro |

QST12                                         close or Esc Key

Code:       QST12
Label:      What bathroom renovations do you require?
Type:       radio
Mandatory:  1

Options
OPT12: Full Bathroom Renovation
OPT13: Partial Bathroom Renovation
OPT14: Shower Screens Only
OPT15: Materials Only

Consumer Feedback

Consumer Name: [            ] (Search)                                      More search options

| Date | Consumer | Job | Feedback Summary |
|---|---|---|---|
| 11/08/2009 9:01:am | ghgjgjkgjkg fghfjgfgfh | Funerals at ROSE PARK, Adelaide City 5067 | Quotify provider chosen and rated |
| 30/07/2009 4:54:am | Andrew Jessup | Funerals at ROSE PARK, Adelaide City 5067 | Quotify provider chosen and rated |
| 30/07/2009 12:17:am | Andrew Jessup | Funerals at ROSE PARK, Adelaide City 5067 | Quotify provider chosen and rated |
| 29/07/2009 9:30:pm | ANDREW J | Funerals at WEST MELBOURNE, Melbourne City 3003 | Quotify provider chosen and rated |
| 28/07/2009 11:22:am | TEST JES | Funerals at 2037 | Quotify provider chosen and rated |
| 01/07/2009 12:28:pm | craig brooks | Funerals at CHIFLEY NSW 2036 | Quotify provider chosen and rated |
| 01/07/2009 12:28:pm | Kalinda Marsh | Funerals at EBENEZER NSW 2756 | Quotify provider chosen and rated |
| 01/07/2009 12:27:pm | Mags Lockington | Funerals at LIVERPOOL NSW 2170 | Incomplete |
| 01/07/2009 12:27:pm | steven pas | Funerals at WARBURTON VIC 3799 | Non Quotify provider chosen |
| 01/07/2009 12:27:pm | Florence Lohanda | Funerals at NARWEE NSW 2209 | Incomplete |
| 01/07/2009 12:27:pm | vicki richards | Funerals at ALTONA VIC 3018 | Incomplete |
| 01/07/2009 12:27:pm | Phill Knight | Funerals at ROOTY HILL NSW 2766 | Incomplete |
| 01/07/2009 12:27:pm | lucia sutton | Funerals at CORDEAUX HEIGHTS NSW 2526 | Incomplete |

Figure 34

Andrew Jessup

Feedback Date – 30-Jul-09 00:17:21

| Feedback Question | Answer |
|---|---|
| Have your suppliers contacted you? | Yes, enough suppliers have contacted me |
| Have you finished this job? | Yes, the job has been completed |
| Who did you choose? | Micheal Jackson Funerals |
| Quality | 4 |
| Budget | 3 |
| Communication | 4 |
| Value | 5 |
| Timeliness | 5 |
| Courteous | 2 |
| Cleanliness | 2 |
| Any additional feedback? | No feedback at this time |

Figure 35

Andrew Jessup

Status - Matched

| Job Details | Match Rules | Unmatched Providers | Matched Providers |

Consumer Details

| | |
|---|---|
| Name: | Andrew Jessup |
| Email: | andrewj@test-account22.com.dd |
| Address: | ghgjhghjghjgjh 2121 |
| Phone: | 02 7787 7778 |

Job Details

| | |
|---|---|
| Channel: | Match Point Funerals |
| Vertical: | Funerals |
| Revenue: | 144.30 |
| Date: | 11-Aug-09 09:00:02 |
| Job Description: | Funerals at ROSE PARK, Adelaide City 5067 |

Leads

| Id | Provider | Revenue |
|---|---|---|
| 665 | Janice Joplin Funerals | 48.10 |
| 664 | Micheal Jackson Funerals | 48.10 |
| 662 | Phils Epic Funerals | 48.10 |

Figure 36

Manage Verticals

Vertical Name: [          ] (Search)

| Id | Name | Status | Match Rules | Ranking Rules |
|---|---|---|---|---|
| 62 | Bathrooms | active | Lep_Match_Cap, Lep_Match_QuestionExact, Lep_Match_JobLocation, Lep_Match_BackfillDefault | Lep_Rank_DaysLastMatch, Lep_Rank_CurrentLeadPrice |
| 59 | Carpet Cleaning | active | Lep_Match_Cap, Lep_Match_QuestionExact, Lep_Match_JobLocation, Lep_Match_BackfillDefault | Lep_Rank_DaysLastMatch, Lep_Rank_CurrentLeadPrice |
| 67 | Catering | active | Lep_Match_Cap, Lep_Match_QuestionExact, Lep_Match_JobLocation, Lep_Match_BackfillDefault | Lep_Rank_DaysLastMatch, Lep_Rank_CurrentLeadPrice |
| 61 | Cleaning | active | Lep_Match_Cap, Lep_Match_QuestionExact, Lep_Match_JobLocation, Lep_Match_BackfillDefault | Lep_Rank_DaysLastMatch, Lep_Rank_CurrentLeadPrice |
| 72 | Conveyancing | active | Lep_Match_Cap, Lep_Match_QuestionExact, Lep_Match_JobLocation, Lep_Match_BackfillDefault | Lep_Rank_DaysLastMatch, Lep_Rank_CurrentLeadPrice |
| 69 | Demolition | active | Lep_Match_Cap, Lep_Match_QuestionExact, Lep_Match_JobLocation, Lep_Match_BackfillDefault | Lep_Rank_DaysLastMatch, Lep_Rank_CurrentLeadPrice |
| 66 | Fencing | active | Lep_Match_Cap, Lep_Match_QuestionExact, Lep_Match_JobLocation, Lep_Match_BackfillDefault | Lep_Rank_DaysLastMatch, Lep_Rank_CurrentLeadPrice |
| 64 | Finance | active | Lep_Match_Cap, Lep_Match_QuestionExact, | Lep_Rank_DaysLastMatch, Lep_Rank_CurrentLeadPrice, |

Figure 37

Carpet Cleaning

Status – active

| Vertical Details | Question Usage | Channel Usage | Price Points |
|---|---|---|---|

| PRICE POINTS | | |
|---|---|---|
| Question Code | Question Label | Charge Type |
| QST391 | What services do you provide? | Base Charge |
| Option Code | Option Label | Default Price Point |
| OPT449 | Commercial Carpet | $0.00 |
| OPT450 | Commercial Upholstery | $0.00 |
| OPT451 | Residential Carpet | $0.00 |
| OPT452 | Residential Upholstery | $0.00 |

| Question Code | Question Label | Charge Type |
|---|---|---|
| QST507 | Number of Rooms | Supplementary Charge |
| Option Code | Option Label | Default Price Point |
| OPT933 | 1 | -30.00% |
| OPT934 | 2 | $0.00 |

Figure 38

COMPUTER IMPLEMENTED METHODS AND SYSTEMS OF DETERMINING MATCHES BETWEEN SEARCHERS AND PROVIDERS

CROSS-REFERENCE TO RELATED APPLICATIONS

This application claims priority to and the benefit of U.S. provisional patent application Ser. No. 61/089,002, filed on Aug. 14, 2008 by Paul McCarney, et al., entitled "COMPUTER IMPLEMENTED METHODS AND SYSTEMS OF DETERMINING MATCHES BETWEEN SEARCHERS AND PROVIDERS" and U.S. provisional patent application Ser. No. 61/110,935, filed on Nov. 3, 2008 by Paul McCarney, et al., entitled "COMPUTER IMPLEMENTED METHODS AND SYSTEMS OF DETERMINING MATCHES BETWEEN SEARCHERS AND PROVIDERS." The entire disclosures of both of these are hereby incorporated by reference as if set forth in their entirety for all purposes.

BACKGROUND

The inventive subject matter is generally directed to matching a party with another party based on profiling of the parties for parameters that are relevant to making a match. In some embodiments, the inventive subject matter facilitates matches between searchers (e.g., consumers) and service providers based on assignment of searchers and service providers to predefined Buyer Types or Service Provider Types based on questionnaires, surveys, third party proxy ratings from, for example, yelp.com or citysearch.com, and other sources of data. This process includes, but may not be limited to the acquisition ("registration") of sufficient data to profile a searcher ("project") via a set of questions customized to be of relevance for a particular market of searchers ("channel") in order to match them to one or more providers that may individually or collectively provide services in one or more vertical industries ("verticals"). In some embodiments, the inventive subject matter also contemplates creation of a set of leads based on varying degrees of matching between the searching party and the providing party. The set of leads may be used by a party to evaluate the possibility of entering into a transaction or relationship with the other party. In some embodiments, the inventive subject matter is directed to a system for valuing and monetizing a set of leads to offer to a party.

In some embodiments, Industry Capacity Profiles are created and used to match searchers to industry categories of potential interest. The searchers matched to an industry category may be further matched to service providers for the category.

In some embodiments, the inventive subject matter is directed to mobile applications for matching searchers with providers based on knowledge or awareness of the locations of the either or both parties.

In some embodiments, the inventive subject matter is directed to creating or updating a searcher's profile and/or presentation of advertisements and promotion to the searcher contextually based on the searcher's interaction with content on an electronic page, such as a web page.

While there are known systems for matching searchers in need of a good with a merchant providing the good, in the services sector, there is still a strong need for improved systems for more efficient matching. This is because the efficient matching of service providers involves many attributes that have a dynamic, fluxing nature. There are also subjective factors that a searcher and/or provider must express that must be classified and weighted for matching purposes. Accordingly, there is a significant need for matching systems that more efficiently process the dynamic, fluxing and subjective factors, and then corresponds them to or adjusts them for actual experience or other new information. Unfortunately, the current search systems largely only allow for factoring of binary, objective data. For example, "is the service provider located in the searchers geographical region." There is need for a more flexible approach that allows for a service region not to be a binary screening factor, if, for example, there is real-world data of prompt and successful service to other searchers in the same region by a service provider who might not otherwise appear to be reasonably close to the region.

In addition, if there is a need for improved systems for registering users who wish to participate in a matching system and creating profiles for use in matching. Current technology implementations are not sufficient to satisfy the needs of efficient registration or profiling.

Accordingly there is substantial need for more sophisticated matching of parties, such as searchers and service providers, that leverages and is adaptive to dynamically changing data, varying attributes, and attribute weightings, and/or availability of new or supplemental, such as ratings, as well as searcher and provider preferences that are determined in progress.

Additionally there is a need for improved registration and profiling techniques that may be used in a system for efficient matching. There is also a need for systems and mobile applications that allow mobile service providers and searchers in geographical proximity to be matched so that service costs may be lowered because the service provider can save time and travel costs by concentrating service calls to a localized area. There are many other problems and needs addressed by the inventive subject matter disclosed herein.

SUMMARY

The inventive subject matter generally addresses the aforementioned needs and problems by providing an efficient and adaptive architecture for conducting matching of a party who is looking for something that another party can potentially provide. The architecture may be implemented and managed by an intermediary party that valuates and monetizes the matching of parties. The party looking for something may be referred to generally herein as a "searcher" and the party with a potential to provide something may generally be referred to as a "provider".

In some embodiments, the inventive subject matter is directed to a data capture and profiling system with one or more of the following, alone or in various combinations:

A system for optimizing party matching outcomes through adaptive, evolving multivariate profiles for searchers and/or providers.

A presentation agnostic mechanism for profiling searchers and matching them to providers. The inventive subject matter will be able to capture the information required to profile a searcher across multiple formats and devices, including but not limited to web, mobile device, desktop application software or interactive voice response systems.

A flexible industry agnostic profiling process to profile searchers, that decouples the question content from the data used to profile providers can initiate leads to multiple providers in multiple industries per submission from a searcher. It will also allow for flexible testing of different experiences to the same market to assess effects that encourage completion of registration.

The ability to allow non-technical staff to configure the above profiling process through a graphical user interface.

In order to support a flexible industry agnostic profiling process the inventive matter includes the ability to implement industry specific business rules that determine which providers are matched to a searcher in a structured form. This includes the ability to define industry specific match rules and ranking attributes, and for these to be influenced by the needs of the searcher and provider being considered for matching.

The ability to allow non-technical staff to configure match rules and related business logic through a graphical user interface.

The ability to assign a cost to one or more searchers depending on attributes of the searcher and the provider.

Support for the matching not only multiple providers to a single searcher, but also a single provider to a single searcher ("exclusive match") for an additional charge to the provider and The ability to initiate additional actions to remote systems following a profiling event—Such actions might include follow-up for prospective searchers or sending a lead to a $3^{rd}$ party Customer Relations Management (CRM) system.

In certain embodiments, the inventive subject matter solution achieves these aims through the development of a series of coupled processes. Each of these processes is responsible for a discrete aspect of the registration process, relying on decisions made and data acquired in previous steps.

In some embodiments, the inventive subject matter facilitates matches between searchers and service providers based on assignment of searchers and service providers to predefined searcher or Service Provider Types based on questionnaires, surveys, and other input and feedback mechanisms. In some embodiments, the inventive subject matter also contemplates creation of a set of leads based on varying degrees of matching between the searching party and the providing party. The set of leads may be used by a party to evaluate the possibility of entering into a transaction or relationship with the other party. In some embodiments, the inventive subject matter is directed to a system for valuing and monetizing a set of leads to offer to a party.

In some embodiments, an Industry Capacity Profile is created and used to match searchers to industry categories of potential interest. The searchers matched to an industry category may be further matched to service providers for the category.

In some embodiments, the inventive subject matter is directed to mobile applications for matching searchers with providers based on knowledge or awareness of the locations of the parties.

In some embodiments, the inventive subject matter is directed to creating or updating a searcher's profile and/or presentation of advertisements and promotion to the searcher contextually based on the searcher's interaction with content on an electronic page, such as a web page.

A tangible, computer-readable medium containing executable instructions for determining matches between searchers and providers, comprising: assigning a searcher and/or provider to a respective buyer type and/or service provider type that is based on responses to a set of questions adapted to characterize the searcher and/or provider as one of a plurality of a predetermined buyer types and/or service provider types; from the buyer type and/or service provider type, determining a set of default weighted attributes that are assumed or assigned to be important to a searcher or provider of a given type, and using the weighted attributes to create a profile for the searcher and/or provider; matching a buyer profile to one or more providers having profiles with one or more attributes in common with the attributes in the searcher profile, the matching being allowed to occur over a range of distances from a buyer profile; updating attribute weightings or rankings for a buyer profile and/or service provider profile based on (i) feedback from the searcher, service provider, third parties following interactions between searchers, and service providers, (ii) predetermined intervals, and/or (iii) other relevant information relevant to weightings or rankings.

In the foregoing embodiment, the searcher may be a consumer. The provider may be a service provider. The searcher may be a business. The provider may be a business. The questions may be presented to a searcher to create an initial buyer profile that is matched with service provider profiles. There may be presenting to the consumer or service provider a set of matches ranked according to the degree buyer profile(s) matches with a service provider profile(s). There may be assigning a monetary value to matches and offering the matches to a service provider or searcher according to the value. The monetary value may be determined according to degree of match or past performance history of the searcher at selecting a service provider matched in a search. The consumer and/or service provider may be able to select the number of ranked matches to be presented. There may be a graphical user interface, the interface being provided on an online directory of businesses that are potential providers, the directory accessed by a searcher/searcher through a browser. Subsequent searches the assignment of a searcher to a buyer type may be used to make recommendations for the searcher as to service providers across service category channels. A mobile application may be used to determine a service provider's availability and/or capacity to take additional work within a given time period. The system may identify a pool of searchers that could be the basis of group or other special discounts or offerings. The monetary value may be determined by assigning a base value corresponding to attributes of the service provider profile and a supplemental value corresponding to attributes of the job.

A tangible, computer-readable medium containing executable instructions for matching a searcher with a provider, comprising the following steps: identifying subject matter representing a particular need of a searcher and matching the subject matter to a set of one or more potential providers who meet predetermined criteria indicating that they are capable and available to provide a solution for the need; presenting a searcher and/or provider with a set of questions to determine attributes of importance to the searcher or provider, the questions representing a plurality of attributes that correspond to a plurality of predetermined buyer and/or service provider types, each question being answerable by the searcher and/or provider selecting from a range of predetermined answers (or statements); assigning the searcher and/or provider to one of the predetermined buyer and/or service provider types according to the answers to the questions, and creating an initial buyer and/or service provider profile based on a default set of weighted or ranked attributes for a buyer or service provider type; from the set of potential providers matched to the subject matter, matching the initial profile of the searcher and/or provider with one or more searchers; and ranking the matches according to the degree the attributes in a searcher-profile/provider-profile pair match.

In the foregoing embodiment, the searcher may be a consumer. The provider may be a service provider. The searcher may be a business. The provider may be a business. The questions may be presented to a searcher to create an initial buyer profile that is matched with service provider profiles. There may be using both (1) initial service provider profiles assigned to a service provider type based on less than a full set of attributes for a provider profile, and (2) service provider profiles that are updated from such initial profiles after searchers provide input on a service provider relating to a missing attribute for a service provider type. There may be presenting to the consumer or service provider a set of matches ranked according to the degree buyer profile(s) matches with a service provider profile(s). There may be assigning a monetary value to matches and offering the matches to a service provider or searcher according to the value. The monetary value may be determined according to degree of match or past performance history of the searcher at selecting a service provider matched in a search. There may be capability attributes are used that are based on job location; product/service required (sub categories); or size and type of job required; and the availability attributes are used that are based on service provider capacity, responsiveness history for a service provider; or availability specifications of a service provider. The consumer and/or service provider may be able to select the number of ranked matches to be presented. There may be a graphical user interface, the interface being provided on an online directory of businesses that are potential providers, the directory accessed by a searcher/searcher through a browser. Subsequent searches the assignment of a searcher to a buyer type may be used to make recommendations for the searcher as to service providers across service category channels. A mobile application may be used to determine a service provider's availability and/or capacity to take additional work within a given time period. The system may identify a pool of searchers that could be the basis of group or other special discounts or offerings. The monetary value may be determined by assigning a base value corresponding to attributes of the service provider profile and a supplemental value corresponding to attributes of the job.

A computer-implemented method of matching in an intermediary matching system, comprising: tracking or updating the system with the location of one or more service providers on a computer outputting from the computer a notification to one or more searchers having stored Buyer Profiles of the one or more service providers in a predetermined proximity of the service providers based on attributes in a Buyer's Profile; associating the notification with an offer from a service provider or an invitation to meet with the service provider on the computer; and processing a response from the searcher to the notification on the computer, the response being used to update the one or more service providers as to one or more matching searchers.

A computer implemented method comprising: storing on an intermediary computer system for matching (1) a set of profiles of searchers; (2) a set of profiles of service providers; and (3) a set of profiles of industry categories; matching one or more searchers to one or more of the industry categories on the intermediary computer system; based on a match, outputting from the intermediary computer system: (1) the searcher a list of one or more services providers in the matching category; (2) a service provider in the matching category a lead or offer for a lead to a matching searcher; and/or (3) a searcher with an offer for information or services for the matching category.

In the foregoing embodiment, a searcher profile may be created. The searcher and prover may be matched using any method described above.

A computer implemented method comprising: storing on an intermediary computer system for matching (1) a set of buyer profiles of searchers; (2) a set of service provider profiles for service providers; and, optionally, (3) a set of industry capacity profiles of industry categories; receiving on the intermediary computer system data representing a user's interaction with a survey that is presented to a searcher/user of an electronic page on a remote computer system based on the user's interaction with a specific item of content on the electronic page, the data including an identifier or indicator for the context of the content; creating or updating a searcher's buyer profile with attributes related to the content on the intermediary computer system; matching on the intermediary computer system the searcher to one or more service providers and/or the industry categories corresponding to the context of the content; based on a match, outputting from the intermediary computer system: (1) the searcher a list of one or more matching services providers; (2) a matching service provider a lead or offer for a lead to a matching searcher; and/or (3) a searcher with an offer for information or services for a matching industry category.

In the foregoing embodiment, a searcher profile may be created. The searcher and prover may be matched using any method described above.

A computer-implemented method of determining matches between searchers and providers, comprising: providing a buyer profile comprising a buyer type for a searcher on a computer; providing a plurality of service provider profiles on the computer; matching using the computer, one or more service providers based on the buyer type; and outputting the matching service providers from the computer.

In the foregoing embodiment, the provided buyer type may be based on the searcher's responses to a set of questions adapted to characterize the searcher as one of a plurality of a predetermined buyer types on the computer. The service provider profile may comprise a number of days since the provider was last matched to a searcher. Matching service providers may be further based on a number of days since the provider was last matched to a searcher. Matching service providers may be further based on feedback following interactions between searchers and service providers. The service provider profile may comprise a service provider type. The matching may be based on matching the buyer type to the service provider type. The service provider profile may comprise a plurality of weighted attribute values. The matching may comprise mapping each buyer type to a plurality of weighted attribute values and one or more weighted attributes have a numerical value within a specified range for the searcher and the provider. The feedback may be filtered to feedback submitted by feedback parties with the same buyer type as the searcher. A mobile application may be used to determine a service provider's availability and/or capacity to take additional work within a given time period. Matching may be based on the service provider's availability and/or capacity to take additional work within a given time period. Outputting may comprise notifying one or more mobile providers of searcher leads in a predetermined proximity of the mobile providers current position or planned position. Outputting may comprise notifying one or more searchers of one or more mobile providers in a predetermined proximity based on the mobile providers current position or planned position. Notifications may further comprise one or more terms for receiving the lead and further comprising receiving an acceptance of the terms and outputting to the provider contact information for the searcher. The terms may comprise a fee. The fee may monotonically increase after a service provider agrees to pay the fee. There may be asking the searcher additional questions. There may be refining the weighted attributes to differ from the weighted attributes obtained from mapping the buyer type based on the additional questions. The buyer profile may further comprise a vertical. The matching may comprises applying a plurality of matching rules enabled for the vertical, wherein the matching rules include or exclude providers based on the buyer profile. The matching may comprise ranking providers based on a plurality of ranking rules enabled for the vertical. The ranking rules may supply a weighted fitness value.

A tangible, computer-readable medium containing computer-executable instructions for determining matches between searchers and providers, comprising: computing a plurality of weighted attributes based on subjective factors relevant to an area of need; and matching one or more providers based on the sum of the weighted attributes.

In the foregoing embodiment, the area of need may comprise a vertical. Each weighted attribute may be calculated by a ranking rule for the vertical. The service provider profile may comprise a service provider type. Each buyer type may be mapped to weighted attribute values. The matching may comprise matching one or more weighted attributes with a numerical value within a specified range. Assigning a provider profile may comprise assigning a plurality of initial numerical attribute values from an industry attribute template for that provider. Assigning a provider profile may comprise calculating numerical values for one or more additional attributes based on input provided by a service provider. Assigning a provider profile may comprise additional attributes not provided from the industry attribute template. The attributes may comprise the attributes comprise one or more capability attributes selected from the group comprising product/service sub categories required and size and type of job required. The attributes may comprise one or more availability attributes selected from the group comprising service provider capacity, responsiveness history for a service provider, and availability specifications of a service provider. A mobile application may be used to determine a service provider's availability and/or capacity to take additional work within a given time period. Matching may be based on the service provider's availability and/or capacity to take additional work within a given time period. Outputting may comprise notifying one or more mobile providers of searcher leads in a predetermined proximity of the mobile providers current position or planned position. Outputting may comprise notifying one or more searchers of one or more mobile providers in a predetermined proximity based on the mobile providers current position or planned position. Notifications may further comprise one or more terms for receiving the lead and further comprising receiving an acceptance of the terms and outputting to the provider contact information for the searcher. The terms may comprise a fee. The fee may monotonically increase after a service provider to agrees to pay the fee.

A method of transforming data representing tangible property, comprising: acquiring registration data about a searcher corresponding to an area of need related to tangible objects or property; profiling a buyer type for the searcher based on the searcher's responses to a set of questions adapted to characterize the searcher as one of a plurality of a predetermined buyer types; and matching service providers based on the buyer type and the registration data; and outputting the matching service providers.

A computer implemented method comprising: storing on an computer system a set of one or more industry capacity profiles; storing on an computer system a set of one or more searcher profiles; matching one or more industry capacity profiles on the computer system with the searcher profile; outputting a promotion for the one or more service providers to a searcher.

In the foregoing embodiment, the industry capacity profile may be relevant for a particular date range or season. The matching may comprise matching the current date within the particular date range or season.

The foregoing is not intended to be an exhaustive list of embodiments and features of the inventive subject matter. Persons skilled in the art are capable of appreciating other embodiments and features from the following detailed description in conjunction with the drawings.

BRIEF DESCRIPTION OF THE DRAWINGS

The following figures show embodiments according to the inventive subject matter, unless noted as showing prior art.

FIGS. 13-14 illustrate one embodiment where questions are asked sequentially and different questions may be posed based on the searcher's responses to earlier stage questions.

FIGS. 15-17 illustrate one embodiment that captures a variety of types of data.

FIGS. 21-23 show one embodiment where an administrator's interface allows, for example, non-technical employees to create and configure questions and rules.

FIGS. 24-30 show configuration of matching rules.

FIGS. 31-35 show a searcher feedback mechanism.

FIG. 36 shows a user interface for presenting details about a job.

FIG. 37 shows a user interface for managing match rules and ranking rules for verticals.

FIG. 38 shows an interface for managing lead prices for a vertical.

DETAILED DESCRIPTION

Figure 1:
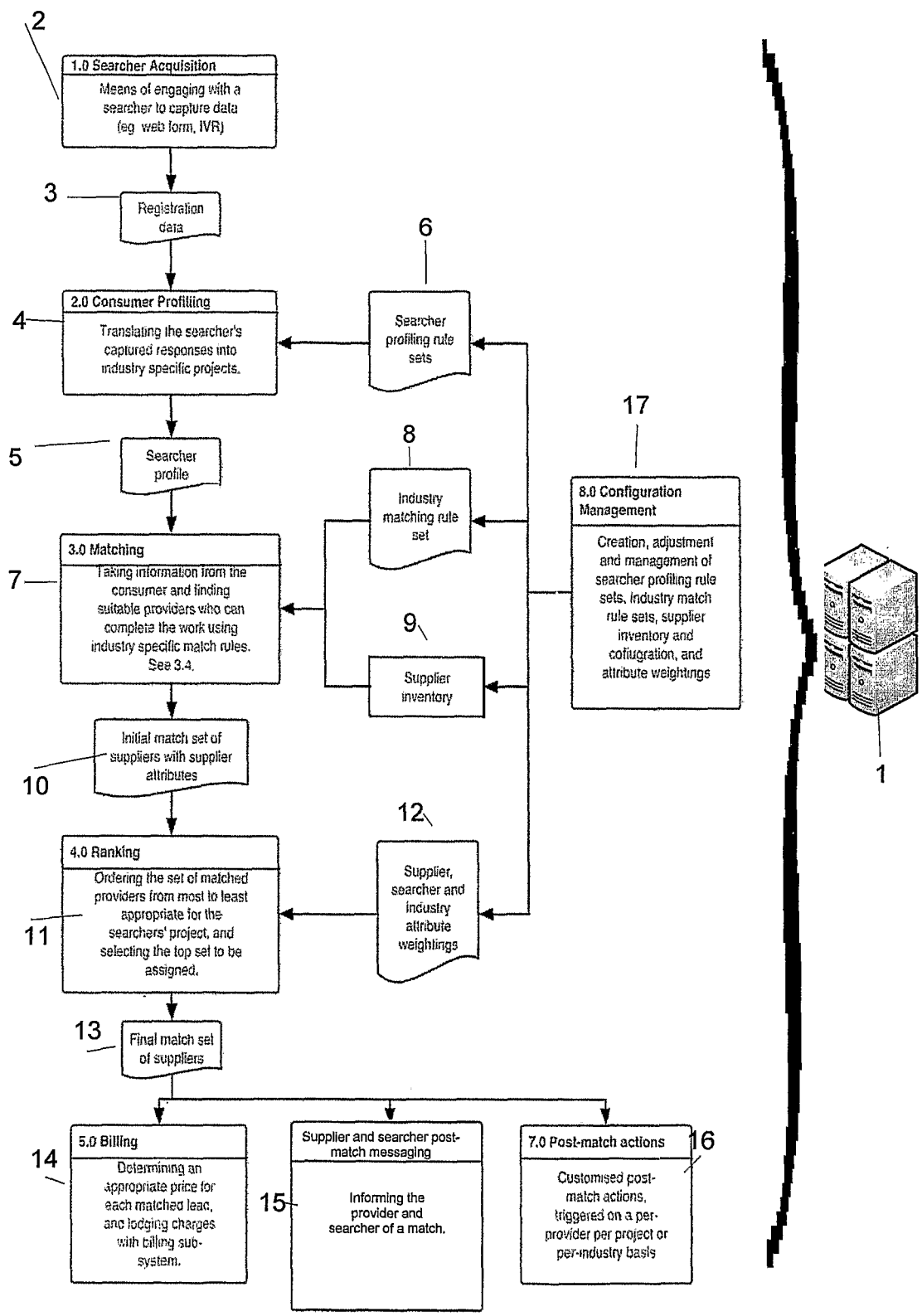
FIG. 1 shows an overview of a representative registration and matching system.

The inventive subject matter is generally directed to efficient matching between a party (individual or entity) in need of something ("searcher") and a party (individual or entity) that can potentially fill that need ("provider"). Not only may the system be used in the context of matching of a searcher who is a consumer to a service provider, but it can also benefit a number of other situations where there is need for efficient matching. For example, the searcher could be a business and the provider could be another business (a B2B context). As another example, the searcher could be a student seeking to match a provider that is an academic institution with the right programs, graduate hiring history, costs, etc. As a further, example, the searcher could be a philanthropist seeking to match charitable organizations based on attributes such as cause, operating expenses versus results, location, affiliations, etc. Accordingly, for convenience, and not limitation, the following description will be illustrated in terms of matching consumers and service providers for potential transactions. The terms "searcher", "buyer" and "consumer" are generally used herein interchangeably, unless context indicates a more specific meaning. Also the term "system," unless content indicates otherwise, is used in a broad sense to refer to any one or more of methods, hardware, software, algorithms, or other avenue for implementing the functionality described herein. As is well known in the art, the system may be represented not only by a single machine, but also as a distributed set of machines or hardware components that are coupled to each other using a digital network.

While there are known systems that help searchers match goods offered by merchants, the inventive subject matter advantageously provides improved systems for efficient matching. In some embodiments, the inventive subject matter provides for determining and assigning a party to a Buyer Type based on acquiring relatively limited information about a party through an initial questionnaire, for example. For each Buyer Type, there are a set of attributes, which may be weighted or unweighted, and assumed or assigned to be of importance to the party in matching to job, project or other subject of a search. The Buyer Type's assigned set of weighted or unweighted attributes allow creation of an initial profile for the party. On subsequent use of the system, a party's profile may be refined according to further information. For example, the profile may be refined based on the actual experiences of a party with service providers, such as may be collected and stored using post-transaction surveys with a party. The profile may also be updated according to information obtained from third parties. For example, third party evaluators may include credit agencies that rate searchers and service providers; accreditation agencies; licensing entities; independent rating services; public forums, etc.

The inventive subject matter also provides a system for an intermediary party to valuate and monetize leads generated for use by a searcher or provider to secure a transaction with the other party. For example, in various inventive embodiments, the intermediary party provides matching of a single searcher to a single service provider, matching of a single searcher to multiple service providers; matching of multiple searchers to a single service provider, and matching of multiple service providers to multiple searchers. The matching sets may be offered to either or both of the searchers and service providers as leads. The matching sets can be ranked based on closeness of match or other filtering factors. The matching sets may also be valuated according to closeness of match or other factors, such as the past transaction histories of parties. For example, how often has a searcher selected a service provider from a list provided by the intermediary party? If a searcher or searchers on a matching set of searcher/service provider leads have a good history of selecting a service provider from the intermediary party's leads, this would allow the intermediary party to sell the leads for a higher price to one or more of the service providers in the matching set, as compared with a matching set that had searchers with no past history of transactions. By the same token, a set of leads that scores services providers according to past transaction histories could be valued higher for offering to searchers. The inventive subject matter also contemplates a system wherein the intermediary provides a bidding or auction system for leads. For example, the intermediary party may sell leads to a service provider found to match one or more searchers by taking bids or auctioning.

The inventive subject matter may be implemented using a special purpose computer, a general purpose computer programmed with particular software, and/or a tangible, computer-readable storage medium. The terms "computer-readable medium" and "tangible, computer-readable medium" as used herein refer to any tangible storage and/or transmission medium that provides instructions to a computer processor for execution including, but not limited to, RAM, NVRAM, static RAM, floppy disk, magnetic hard disk, solid-state hard disk, PROM, EPROM, FLASH-EPROM, CD-ROM, DVD-ROM, Blu-ray, HD-DVD, and any recognized equivalent or successor technology. Tangible, computer-readable media may be configured to store a set of instructions for performing various features and functions described herein, using, for example, any number of known computing devices, such as general purpose computers or PCs, PDAs, mobile handheld devices and phones, web servers, etc. The computing devices may be distributed from one another and communicate over known network systems, such as the Internet, WANs, LANs, telecommunications infrastructure, e.g., landline, mobile lines, satellite, with any known wired and/or wireless protocols. Data may be processed and stored and exchanged through any of various known hardware and software systems for storing and processing data. In certain embodiments, the inventive subject matter incorporates a web-based application with appropriate graphical user interfaces for users to input data and to view data and information.

In some embodiments directed to a registration and profiling system for use with a matching system, the inventive subject matter can facilitate the following advantageous objectives for the intermediary party of the inventive embodiments, and accordingly provides clear advantages over conventional systems for an intermediary involved in the business of matching parties:

Increasing revenue and lowering advertising costs through improving searcher acquisition, for example:
By allowing multiple matching events to be initiated from a single searcher profile, revenue per acquisition can be improved.
By profiling prospective and repeat customers early it is possible to capitalize on cross-sell, re-sell and up-sell opportunities, thereby raising revenue per acquisition.
By providing tools to improve the searcher experience in line with (and exceeding) market expectations, the frequency and success of profiling events improves and cost per acquisition is decreased.

FIG. 1 provides an overview of one possible embodiment of a registration and profiling process implemented as a general purpose computer 1 programmed with executable instructions according to the inventive subject matter. Each step in the figure is labeled with a number that is discussed in the correspondingly numbered section below.

1.0 Searcher Acquisition

Searcher acquisition 2 is the process of capturing information, such as registration data 3, from a searcher about an area of need, such as a project or job. The inventive subject provides an improved registration system for more efficient and adaptive matching than is currently employed in the industry.

In conventional systems, the registration forms produced for searchers are tightly coupled to the profiling criteria required to produce them, imparts technical and logistical limitations on adapting and evolving said profiles. For example, such forms may be in the nature of a single registration form that can only submit projects for a single vertical.

In addressing these needs, the inventive subject matter provides a solution which, among other things, can support more complex profiling transactions that are able to capture sufficient information to produce multiple projects.

For instance, a single registration event may involve a complex branching form that may:
Branch at any point (that is, show a new set of questions based on the response to any previous question).

Ask questions in any order (within a set of branched questions).

Suggest responses for (and optionally, suppress the display of) questions for which the answer is already known based on a searcher's previous registration in the same or a different vertical. This feature should be sensitive to the timing of the previous registration. For example, if the searcher has told us their house has 4 rooms in a removals project that was less than 4 months ago, it may wish to be assumed that their house still has 4 rooms when they come to complete a carpet cleaning project.

Allow for a complete transaction where the searcher does not initiate any projects, such as when a searcher is just prospecting for information, or requesting a service which an intermediary may not currently offer. Such projects may be addressed through remedial action such as a follow-up e-mail.

The forms may be presented to the searcher in any structured form, such as a branching form either on a single page, or as a multi-page 'wizard style'.

It should be possible for the business to alter aspects of all of the above and efficiently conduct experiments such as A/B or multivariate tests to see which is more effective in generating conversions.

Some data captured may describe tangible objects or locations. Data captured may relate to tangible property such as the searcher's house (number of rooms or the type of carpet). Data captured may relate to the location of tangible property such as a postal code. Data captured may relate to tangible objects such as locks owned by the homeowner to be installed.

Some data captured may relate to intangible properties. Data captured may relate to the bond amount for a real person or a legal corporation. Data captured may relate to feelings of a real person such as a level of urgency (emergency or general) or a desired time of day for a site visit.

An example of a form that utilizes these extensions is presented below. FIGS. 13-14 illustrate one embodiment where questions are asked sequentially and different questions may be posed based on the searcher's responses to earlier stage questions. FIG. 13 shows one possible interface for selecting a service provider within the "Finance Professional" vertical. The first question asked 1301 is whether the services are for individual or business. The answer given here is Individual. The second question asked 1302 is what type of service is required: Financial Planning, Tax Accounting, Budgeting and Debt Management, or Home Loan.

FIG. 14 shows the same interface where the first question 1301 is answered differently. Instead of Individual, Business is selected. The second question 1402 presents different choices from 1302: Accountant, Bookkeeping, or Business Advisor.

Figure 15:

FIGS. 15-17 illustrate one embodiment that captures a variety of types of data.

FIG. 15 shows collecting the type of system desired 1501. The type of system 1501 relates to the intent of the searcher and corresponds to a real-world, tangible security system to be installed. The type of dwelling 1502 corresponds to an actual structure erected on real property as well as to the intent of the searcher.

FIG. 16 shows collecting job location 1601. This corresponds to a physical region of the earth, within which the job location is located.

FIG. 17 shows collecting a variety of information about the searcher 1701. This may include physical location, legal identity, and means of contact. In addition, the interface requests an affirmative manifestation of assent 1702 to Terms & Conditions.

Post-Submit Messaging

The system may support follow-up messaging for prospecting projects (e.g., "We noticed that you were interested in relocation service providers 3 weeks ago, are you still interested?"). The ability to trigger such actions (see also 7.0), as well as the copy and presentation of the resulting e-mail, may be configurable on a per-channel basis.

In cases where a form provides for registrations for multiple verticals, it is possible that a searcher will be prospecting for some services, and ready to commit to others. Should this be the case, it may be necessary to establish follow-up forms that specifically cater for prospectors for specific industries. Accordingly, an e-mail may be generated to recommend that the user be diverted to other forms, in such cases.

2.0 Searcher Profiling

Searcher profiling 4 is the process of assessing data captured during from searcher registration, in this example, a consumer, and from this creating a searcher profile 5 comprising one or more projects to be used in matching. The project creation step should result in the generation of one or multiple projects, based on the responses received from a searcher's registration form. This is done by matching registration data 3 against searcher profiling rule sets 6. This may include the following, for example:

A single form question, such as 'where are you moving from', or 'how many rooms does your property have' may provide data for multiple projects.

Multiple projects may be created from the same vertical, such as in the example below, in which cleaning projects may be submitted for two properties at different location.

Multiple form questions and per-form business rules may be used to generate the data to create a project. For example, the match criteria for 'small', 'medium' or 'large' for a painting project might be decided by the sum total of the interior and exterior surface to be painted compared to a matrix.

A single form question might inform multiple points of data to create a project such as multiple match criteria. In the example registration presented below, ticking 'Yes' to 'A pest inspection conducted' on Page 4 would (once the form had been completed) result in the generation of a residential pest inspection project.

Not all data captured in a registration event will be used to create projects, and as such the solution must support capturing of responses that are not actually used to create projects. These responses should still be recorded in an accessible format. An example would be a question such as 'Gender' which might be used in future marketing executions, but would not actually be used in matching and would not be sent to any providers.

In some embodiments, match rules sets for each vertical may be defined by non-technical staff. One such embodiment is shown in FIG. 21. Match Rules are pluggable business rules used during the registration process to determine which providers are suitable for matching. Each Vertical should have at least one Match Rule assigned to it. For example, a match rule could filter based on location. Another match rule could filter based on pickup or drop-off location. Another match rule could filter based on daily, weekly, and/or monthly lead caps. Another match rule could filter out providers who don't service the specified job location.

In some embodiments, questions can be managed by non-technical staff. One such embodiment is shown in FIGS. 22 and 23. Questions may be designated as mandatory or optional. Questions are associated with a particular vertical.

3.0 Matching

During the matching step 7, a series of business rules for a particular vertical, the industry matching rule set 8, coupled with the registration data 3 captured during the registration process and the supplier inventory 9, determines which providers are suitable for matching and constructs an initial match set of suppliers with supplier attributes 10. Any provider is willing to receive leads for a particular job may be matched to that job.

Some examples of match rules are shown in FIG. 21. These include a match rule based on location, a match rule based on pickup or dropoff location, a match rule based on daily, weekly, and/or monthly lead caps, and a match rule based on specified job location for verticals which only have one job location.

In conventional systems, the business rules around matching may be difficult to audit, because a number of disconnected areas can affect matching. This also makes it cumbersome to create additional business rules for registration. According to certain embodiments of the inventive subject matter, the system may be configured to provide, for example:

- The registration solution should support the application of inclusive or exclusive rules in a specified order using a modular architecture. Using this architecture, it should be possible for an administrator to easily review a vertical and add in new inclusive or exclusive matching rules. Where necessary, an administrator should be able to configure these rules on a vertical specific basis.
- Match rules should present as modular business rules that can be re-used across different verticals.
- The rules that are in effect for a particular vertical should be visible to an administrator.
- Match rules should have the ability to alter the match set based on data profiled from the searcher during registration, data profiled from providers and data profiled from the searcher.
- In addition, match rules should have the ability to create ranking attributes and assign them to a particular lead. For instance, a match rule that adds to the match set any providers that live within a 30 km radius of the job location might also create an attribute "Distance score" that is the actual distance between the provider and the job location. This distance attribute could then be used to rank nearby providers more highly than distant ones.

Matching rules, that should be available under this architecture may include, for example:

- Add to the match set all providers who have service criteria that match the services requested in the project
- Remove from the match set all providers who do not service the postcode of any of the job locations for the project
- Remove from the match set all providers who do not service all of the project's metadata criteria
- Add to the match set all interstate removal lists if the moving from and moving too addresses of the project are in different states.
- Add to the match set all providers whose office is less than 30 km from the primary job location
- Remove from the match set a provider who cannot travel to the searcher's house as well as their place of business.

Ability to Match Projects to Multiple Match Criteria

Under conventional systems, within a vertical, a searcher can only specify a single match criterion for a project, even though the work they are looking for might involve several match criteria simultaneously. In some embodiments, the inventive subject matter may provide, for example:

- That a searcher should be able to specify multiple match criteria for a specific project, with an optional priority associated with each (e.g., I'm mainly interested in residential cockroaches, but also somewhat interested in residential termites).
- That providers added to the match set should be able to be added on the basis of any of the specified match criteria. In the later ranking stages, providers who are able to service any of the match criteria should be up-weighted against those who are only able to service some of the match criteria.

Support for Multiple Locations and Multiple Location Sets

In some embodiments, the inventive subject matter may provide, for example:

- Multiple locations may apply for a particular project, for example 'Moving from' and 'Moving to' in removals. Match rules should have access to all of these.
- Multiple match sets may apply to a particular provider, for example 'Pick up locations' and 'Drop off locations', or 'Locations for large jobs' and 'Locations for small jobs'. Match rules should be able to operate off these.

In a conventional system, projects may be typically placed in a pending queue after they have been matched to a predetermined number of providers. The searcher is informed of the providers they have been matched to, but the providers are not informed of the searcher. It is possible to modify the details of the job before releasing it from the pending queue; however, the set of providers who are matched to the job may spuriously remain included.

According to some embodiments of the inventive subject matter, in matching step 7, the system may provide for extension of this facility such that if the project is modified to the extent that matching is affected, then the system should be informed and given the option to re-match providers to the project based on the new information supplied. If this occurs, for example, then the searcher should be sent follow-up messaging explaining that they have been re-matched, and a different set of providers will contact them.

4.0 Ranking

Ranking 11 is the process of taking a set of matched providers (that is, those businesses that could possibly complete a project) and from that set selecting the top n providers who will actually be matched to the project or job. The selected set may be ranked in number and/or they may be associated with another selection factor, such as a rating, or flagged with attributes of particular relevance to a searcher.

In some embodiments, the inventive subject matter may provide for matched providers to be ranked to be based on a weighted attribute rule model. In such a model, attributes and values (such as 'suitability' or 'distance') are created by prior match rules or during the ranking process, and then some attributes are then 'weighted' to create supplier, searcher, and industry attribute weightings 12 the software architecture supports the creation of one or more rules implemented in software, that can draw upon data of the target searcher or any matched provider (included data created in the preceding matching step) in order to determine a measure of fit between the searcher and a given provider. An example of this process is described below. The measure of fit created by each rank rule should not have an equal weight in determining a provider's rank, but have a variable weight that may be adjusted on a per-vertical basis. This allows administrative staff to alter the business logic used to match providers to searchers to optimize the match experience, and for the introduction or removal of influences over provider ranking over time.

In some embodiments, the inventive subject matter may provide for a ranking step to be used, for example:

The platform should support ranking of providers to a project based on multiple attributes of the provider, searcher and project.

The attributes should not have an equal weight in determining a provider's rank, but be variable by a number of sources.

Administrative staff should have the facility to manipulate the rank of a provider in matching to the extent where it can be either (a) virtually guaranteed the provider will be matched first to a project, if found to be suitable, or (b) never matched to a project unless there are less than three other providers who should be matched to the project.

Attributes may be based on any number of objective or subjective factors, as illustrated below. Furthermore, attributes may be based on tangible criteria, intangible criteria of an intangible entity, or intangible criteria of a tangible entity. In the ranking context, attributes are used as inputs for match rules. Attributes may be inferred from the searcher's textual input. One embodiment performs a keyword search of text to locate keywords associated with particular attributes. For example, a searcher's use of the word "rental" might indicate that the house is not owner-occupied, signaling that the owner-occupied attribute is false. Subsequently, a match rule which tests if owner-occupied attribute is false would trigger. Another embodiment uses the natural language processing may attempt to infer the tone or emotional content of text. For example, a sentence such as "I am extremely frustrated by the contractor's failure to listen" in previous feedback could be inferred to be a particular sensitivity to the communication evaluations of future providers. A ranking rule might be included that gives more weight to the communication evaluations. One embodiment might infer attributes such as educational level or attention to detail may be inferred from the grammatical correctness or incidences of misspelled words. Use of "cuz" rather than "because" may indicate a lower educational level and trigger a match rule for selecting financial providers who specialize in working with lower education clients may be triggered. Alternatively, a use of the subjunctive mood may indicate a higher-education level and may trigger a ranking rule to bias towards more tax planners who focus on more sophisticated clients.

In some embodiments, the inventive subject matter may provide for one or more ranking steps to be used, for example:

Provider Preference for Jobs of that Match Criteria

Providers should be able to specify match criteria that they prefer to accept. For instance, two financial planners may service Individual Tax Advice, however one may specialize in it, whereas one may prefer to offer Accounting services. These preferences should be captured on the provider's administration console and translate to a 'preference score' for a particular match criteria. When providers are being ranked, their preference score for the match criteria of the project should be taken into account.

Provider Suitability

Once sufficient ratings data has been captured to make a statistically valid assessment, a provider 'suitability' score should be determined based on the average rating for the provider for jobs that are for the same match criteria as the project in question. The suitability score should be relative and determined from previous ratings for that provider from searchers who lodged jobs in the same match criteria.

Provider Ratings

It should be possible to rank providers by each rating criteria available for the vertical they are being matched to.

Effective Lead Price

A criterion that may be used to rate providers will be the effective revenue per lead.

Effective revenue per lead is defined as the average amount of revenue received from a provider per lead for the match criteria of the project being ranked, taking into account credits. For example, if provider A was charged 12 leads at $20 and credited 2 back, their effective lead price would be $16.67. Accordingly, more profitable vendors may get matched higher.

Days Since Last Match

The days since last match figure should be based on the number of days since the provider was last matched to a searcher—such that providers who were last matched longer ago are more likely to be matched. This ensures that providers who are otherwise equal will be matched on a round-robin basis.

Conotive Matching Score

A rank rule may be supplied that calculates a conotive match score—a goodness of fit between a searcher and provider based on a number of attributes, that may include the same attributes as used in rank rules but also from other sources. The conotive matching mechanism is part of the inventive matter and is discussed below.

Future Rules

It is likely that additional rules will be developed and incorporated as new verticals are rolled out, and profiling of providers becomes more detailed.

Sources of Weighting

Rank rule weighting alters the influence of attributes in compiling a final ranking score. In some embodiments, the inventive subject matter may provide, for example:

Vertical Specific Rank Rule Weighting

Any rank rule should have a vertical specific weighting associated with it, allowing the business-logic determining ranking to be adjusted on a vertical specific basis.

Searcher Preference Weighting

The responses of the searcher during registration should have the ability to influence ranking. This should be achieved by a searcher preference weighting that can be inferred from the options they choose during registration. A scenario where user attribute weighting would be employed is to influence the effect of ratings attribute. For example, in the example form below, the searcher can choose which attribute is the most important attribute to them in a provider, such as 'cleanliness'. The weighting of the cleanliness attribute of the matched suppliers in producing a final ranked list of suppliers would be up-weighted in this scenario.

Provider Rank Adjustment Factor

The provider-attribute-adjustment factor is an adjustment metric that is applied to the sum total of a provider's total, weighted attribute score. The weighted attribute score is multiplied by this number. It may be set by the administrator, and used to influence/override the ranking algorithm for a particular provider.

Applying the ranking methods as specified above produces a final match set of suppliers 13.

The embodiment above uses a discrete set of matching rules that include or exclude providers and a discrete set of ranking rules that are weighted and summed to provide a ranking score. However, other embodiments may operate differently. For example, one embodiment omits matching rules and applies simply ranking rules. Yet another embodiment compares the buyer profile with the service provider profile, comparing corresponding attributes to generate a ranking score. These attributes are then weighted and summed to generate a unified ranking score.

In addition to matching by attribute weightings, other embodiments may use other methods of matching. For example, a searcher's responses to questions may be matched with other comparable searchers using techniques such as Bayesian inference, nearest-neighbor methods, or latent variable methods. These techniques may be used separately or in combination with attribute weighting techniques. For example, one embodiment may avoid attribute weightings entirely by using a nearest-neighbor method to rank providers. This embodiment establishes a question space and places all searchers within the question space based on answers to questions. Two searchers that exhibit a high-degree of similarity between question responses are "closer neighbors" than two searchers that have dissimilar responses. This embodiment may rely entirely on ratings from neighbors to the current searcher without establishing a Buyer Type. Another embodiment may use attribute weighting techniques together with a nearest-neighbor method by establishing a single previous searcher who is the nearest in question responses and giving the bad ratings of that searcher "veto power" over rankings that would otherwise have been selected purely based on an attribute weighting technique.

5.0 Billing

According to some embodiments of the inventive subject matter, in billing step 14, the system may provide improved flexibility in the ability to determine the cost of a lead. The following factors may be able to influence the pricing model, for example:

- The match criteria price, as set for each provider (this is current functionality)
- The vertical parameter questions set during registration. These should be able to influence the price of a project by adding or removing a dollar amount.
- The responses to vertical parameter questions, which should be able to influence the total price of a project by adding or removing a discount.
- The type of matching that has occurred (per-lead pricing adjustments will take effect)

FIG. 38 shows a particular billing model for this embodiment. This billing model calculates the cost of a lead using a base charge based on attributes of the provider and supplementary charges based on attributes of the job. In the example shown, the carpet cleaning vertical includes either commercial or residential services and carpet or upholstery. Although the base charges are shown as zero in the sample screen, these would be tuned to a particular fixed amount based on average lead value. In addition, supplementary charges adjust the base amount using job attributes, here the number of rooms to be cleaned. Because the average job includes two rooms, there is no adjustment. However, more than 2 rooms would incur an additional charge, while 1 room would incur a lower charge. This allows the lead price to approximately track profit to the provider and accurately represent the value of the lead. In addition, an automated billing model such as this allows automated handling of leads once the rules are configured.

6.0 Provider and Searcher Post-Match Messaging

Post Submit Page

Following a registration, it should be possible to configure, on a per-channel basis, the display of the page that follows, using supplier and searcher post-match messaging page 15. The page may contain any of the following:

- Cross sell opportunities, presented as a list of links to other registration forms.
- The results of the registration. In the case of multi-vertical registration, this would include the results for all services requested. In the case of a prospecting registration this would simply be copy explaining that they will be reminded in a certain period if they would like to register again.
- Marketing copy, such as banners, special offers, links to other sites, etc.

Attributes that may need to be configured on a per channel basis may include, for example:

- Which of the above items should be displayed?
- The position on screen of the above.
- Presentation, including font, spacing etc.

7.0 Provider and Searcher Post-Match Messaging

According to some embodiments of the inventive subject matter, in post-match actions step 16, the system may provide the ability to extend the capability of the platform by executing channel, vertical, project or provider specific actions. For instance, the system may support such actions being initiated when:

- Particular registration forms are completed.
- A project is created in a particular vertical.
- A particular provider is matched.

The actions may be configured so that there is access to the data of any registration forms, projects, leads, and the searcher relevant to the action. By way of example, such actions may include:

- For removals, if the user has requested during registration, send an e-mail to a specified set of e-mail addresses informing them of the address change of the provider.
- If a high value finance project is submitted, send an electronic message, e.g., an SMS, to the sales manager.
- A project for a particular vertical may require a SOAP service on a remote CRM system to be initiated.

The registration framework may also support such actions on a per-vertical basis. A modular actions framework may be to support such services.

8.0 Configuration Management

According to some embodiments of the inventive subject matter, in configuration management step 17, the system may provide for various registration processes to facilitate efficient matching, such as the development of new verticals, development of acquisition points for those verticals (channels), and the maintenance of existing channels (searcher acquisition points) and verticals (provider acquisition points). Accordingly, the system may flexibly provide for creation, modification and retirement of registration forms in production through a user interface. For example, the system may provide:

- Ability to activate (make available) and deactivate (make unavailable) verticals and channel.
- Ability to add new questions to a channel
- Ability to edit existing questions.
- Ability to map channel questions to a vertical match parameter or vertical question.
- Ability to manage the relationships between form questions and vertical match criteria.
- Ability to add new match criteria and set default prices for each.
- Ability to add new metadata criteria.
- Ability to add, remove and (where appropriate) customize match rules.
- Ability to configure attributes weighting on a per-vertical basis.
- Ability to transfer registration configuration between and from test environments into production.
- Ability to review the results of project creation, matching, ranking and billing for a particular registration. This may include the ability to review results for:

Which projects were created from a particular registration form.

Which providers were matched, and which match rules were responsible.

Which attributes, and final rank each provider was given.

The final match set, and the calculated lead price for each provider.

Any change to a channel or vertical configuration should be logged. Other examples are as follows:

FIG. 21 shows configuring match rules for a vertical.

FIG. 22 shows a list of questions associated with a vertical.

FIG. 23 shows editing a particular question associated with a vertical.

FIG. 24 shows establishing a channel and placing various channel verticals within the channel.

FIG. 25 shows a user interface for viewing questions including a question label, a question type, and whether the question is mandatory or optional, and identifying a question for editing.

FIG. 26 shows a user interface for editing questions including a question label, a question description, a question type (such as radio, select, location, or checkbox), whether the question is mandatory or optional, whether the question is displayed or hidden, the page the question appears on, the sequencing order of the questions on the page, and the parent options for the question.

FIG. 27 shows questions and options for the questions from among the available questions and options.

FIG. 28 shows configuring rules including source questions and options and target questions and options.

Figure 29:
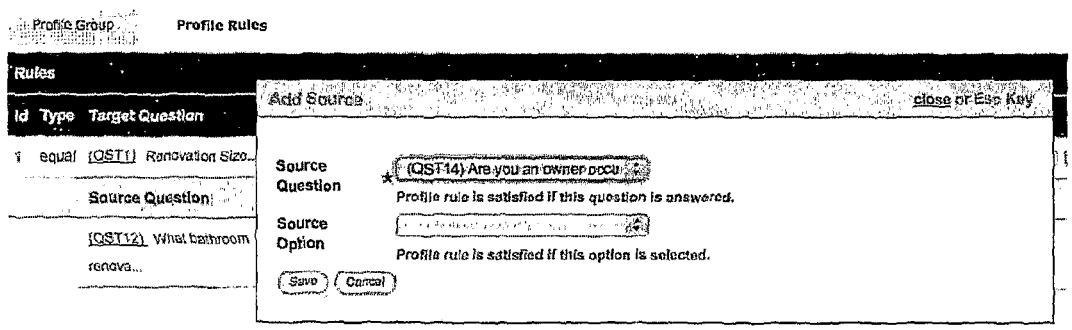

FIG. 29 shows configuring which profile rule is satisfied if a question is answered and optionally which option is required to satisfy the rule.

FIG. 30 shows a summary popup window showing the question properties.

FIG. 36 shows a summary of job details including leads, providers, and revenue for each provider.

FIG. 37 shows a user interface for configuring one or more managing match rules and one or more ranking rules for each vertical.

FIG. 38 shows an interface for managing lead prices for a vertical including base charges and supplementary charges.

Support for Hard Matching, Exclusive and Premium Matching

According to some embodiments of the inventive subject matter, the inventive subject matter may provide support for the following representative matching scenarios:

Quote matching—The current model, under which a provider is matched to up to 3 providers for each vertical they are soliciting quotes for. The three providers are determined by the matching and ranking rules specified in the document.

'Hard' matching—Under this model, a searcher is matched to up to 3 providers for each vertical they are soliciting quotes for. A provider may be forcibly included (hard matched) into the list of matched providers, assuming they pass the match rules. If the provider is not hard matched then another suitable provider should be matched in place. Messaging and user engagement is as for hard matching and Exclusive matching—Under this model, a searcher is matched to a single provider, which has been forcibly included in the list of matched providers. If this provider doesn't meet the match rules, then the matching logic should default to that used for Quote matching.

Premium matching—In premium matching, a set of suitable providers is determined through matching and ranking as for Quote matching. The system may limit participation so that only providers who have signed up to the premium matching service may be connected. Indicators or considerations for defining a premium match may include, for example, the following, as may be determined via a registration process:

The searcher supplies a valid phone number in the registration form.

The most suitable provider is then contacted by phone automatically and if they pick up they are asked if they wish to accept the lead.

If they indicate they wish to accept then they will be automatically connected with the searcher using the phone number supplied during registration.

If the searcher can be contacted and the conversation lasts for longer than 5 seconds, then the transaction is deemed successful and the provider is billed.

If it is possible to connect to the searchers phone line but the transaction ends after less than 5 seconds, our solution is to attempt to re-connect them automatically up to 3 times before giving up.

If the searcher is un-contactable then the transaction is aborted.

If the provider does not pick up or declines the transaction, then the next provider on the list is contacted, and so on until a provider accepts or the end of the list is reached.

If the end of the list is reached, the transaction is re-attempted using Quote matching.

Sample Registration Flow

Table 1 below is an example of a registration form for a searcher for use in a registration flow and matching for multi-vertical matching. The form is used in connection with an interstate residential relocation by the searcher. Sample answers also specified. This form once submitted would invoke the creation of a small interstate relocation project, 2 residential carpet cleaning projects, and a residential pest inspection project.

TABLE 1

| Page 1 | Page 2 | Page 3 |
| --- | --- | --- |
| Welcome to www.movinghouse.com.au. We'd like to ask you a few questions about your move so we can help find the best businesses to help you. | What are you moving? ( ) Everything (personal possessions) ( ) Just moving a couple of things (e.g. table, benches etc.) | In the house you're moving from, are you interested in having: [X] The carpets cleaned How many rooms?__2__ |

TABLE 1-continued

| | | |
|---|---|---|
| What's your email address?<br>__joe@bloggs.com.au__ | Where are you moving to?<br>3313_____ | [ ] The house cleaned<br><br>When would you like this work done? |
| Where are you moving from?<br>2037_____ | Do you own or rent this property?<br>(X) Own<br>( ) Rent | (X ) Before the move<br>   (X) 1 week before<br>   ( ) 2 weeks before<br>   ( ) 3 weeks before ]<br>( ) On the day of the move<br>( ) After the move |
| What are you looking for from us?<br><br>(X ) I'd like a few suitable businesses to contact me so I can compare quotes.<br>( ) I'd like only the most suitable businesses to contact me, I'm not interested in comparing quotes.<br>Do you know where you're moving to?<br><br>(X) Yes, we've bought or are renting a property. We've got time to organize quotes and would like to compare prices.<br>   ( ) Yes, we're about to buy a property. We've got time to organize quotes and would like to compare prices.<br>   ( ) No, we're looking for a property.<br>Next >> | What type of house is it?<br>__Unit____<br><br>How many rooms does the property have?<br>___3____<br><br>How long before you move?<br>(X) As soon as possible<br>( ) Approximately a week<br>( ) Approximately a month<br>( ) On this date<br>_____<br><br><<Back \| Next >> | <<Back \| Next >> |

| Page 4 | Page 5 | Page 6 |
|---|---|---|
| In the house you're moving to, are you interested in having:<br><br>[X ] The carpets cleaned<br>[X ] A pest inspection conducted<br>[ ] The carpets cleaned<br><br>When would you like this work done?<br><br>(X ) Before the move<br>   (X) 1 week before<br>   ( ) 2 weeks before<br>   ( ) 3 weeks before ]<br>( ) On the day of the move<br>      ( ) After the move<br><br><<Back \| Next >> | Are you interested in having alarm equipment installed?<br><br>(X) Yes<br>( )No<br>Approximately how many entrances and exits does your property have?<br>__4_____<br><br>What type of walls?__Brick__<br><br>Other than price, what is most important to you when selecting an alarm system?<br>   __Features and functionality____<br><br><<Back \| Next >> | Which of the following is most important to you in a provider? We can use feedback from others in matching you appropriately.<br><br>( ) Communication and Timeliness<br>(X ) Value for money<br>( ) Quality<br>( ) Courtesy and Cleanliness<br><br>How can we get in touch with you?<br><br>First name:<br>_____<br>Surname:<br>_____<br>Address<br>_____<br><br>[ X ] I agree to the movinghouse.com terms and conditions.<br>Ok, you're all done!<br>Match me now >> |

This example demonstrates a vertical where 5 attributes are at play: (1) Effective lead price, (2) days since last match, and (3) three ratings criteria that are relevant for that vertical.

Ranking providers against a project may include the following stages:

Attribute Weighting is Calculated

Each attribute is assigned a 'Vertical attribute weight'. This is an integer configurable per-vertical per-attribute. The sum of all vertical weights for all attributes should sum to 100.

Additionally, a searcher should also be able to specify an additional weighting for certain attributes (the searcher would not do this directly, but based on the answers to particular question answered during registration, a searcher weight for some attributes would be inferred before matching begins (the means by which answers to questions on a registration determine searcher weighting values is out of the scope of this project). The sum of all searcher weights for all attributes should also sum to 100.

The searcher attribute weight should be used to adjust the final project weight for each attribute. In the example below, shown in Table 2, the 'Cleanliness' and 'Responsiveness' attributes account for 40% of the total vertical weighting. This 40% should be distributed according to the searcher weight (40*0.8=32, 40*0.2=8). This final project weight should also sum to 100.

TABLE 2

| Attribute | Vertical Attribute Weight | Consumer Attribute Weight | Final Project Attribute Weight |
|---|---|---|---|
| Effective Lead Price | 35 | | 35 |
| Days since last match | 5 | | 5 |
| Ratings: Cleanliness | 20 | 80 | 32 |
| Ratings: Responsiveness | 20 | 20 | 8 |
| Ratings: Courtesy | 20 | | 20 |

Raw Scores for Attributes are Collated

For each attribute, raw scores are collated for that attribute for each provider in the matching pool, as shown in Table 3. For ratings attributes where insufficient (i.e., less than 3) ratings data has been collected on that attribute for that provider, the average of that attribute for that vertical would be substituted. In this example, provider B has not been rated enough times to have attribute data for Cleanliness, Responsiveness or Courtesy, and provider D has not been rated enough in the Courtesy category. In these cases, the relevant vertical average is substituted.

TABLE 3

| | Provider A | Provider B | Provider C | Provider D | Vertical Average |
|---|---|---|---|---|---|
| Effective Lead Price | 35 | 35 | 20 | 50 | n/a |
| Days since last match | 3 | 5 | 6 | 1 | n/a |
| Ratings: Cleanliness | 2.3 | | 2.1 | 4.4 | 3.1 |
| Ratings: Responsiveness | 5 | | 4.3 | 3.2 | 4 |
| Ratings: Courtesy | 3.3 | | 1.3 | | 2 |
| Adjustment Factor | 1 | 1.3 | 1 | 0.4 | n/a |

Raw Scores are Normalized

The raw scores for each attribute are normalized to give a value from 1 to 100, as shown in Table 4. The normalization algorithm is:

$$\text{Normalised score} = \frac{\text{Score} - \text{Minimum of series}}{\text{Maximum of series} - \text{Minimum of series}}$$

TABLE 4

| | Provider A | Provider B | Provider C | Provider D |
|---|---|---|---|---|
| Effective Lead Price | 50 | 50 | 0 | 100 |
| Days since last match | 40 | 80 | 100 | 0 |
| Ratings: Cleanliness | 9 | 43 | 0 | 100 |
| Ratings: Responsiveness | 100 | 44 | 61 | 0 |
| Ratings: Courtesy | 100 | 35 | 0 | 35 |

Project Weighting is Applied to Normalized Score, Rank Score Determined

Referring to Table 5, for each provider, the normalized score for each attribute may then be multiplied by the attributes' weight percentage to produce a weighted, normalized score for each provider. The final score for a provider is then determined by summing the weighted score of each attribute for that provider.

TABLE 5

| | Provider A | Provider B | Provider C | Provider D |
|---|---|---|---|---|
| Effective Lead Price | 18 | 18 | 0 | 35 |
| Days since last match | 2 | 4 | 5 | 0 |
| Ratings: Cleanliness | 3 | 14 | 0 | 32 |
| Ratings: Responsiveness | 8 | 4 | 5 | 0 |
| Ratings: Courtesy | 20 | 7 | 0 | 7 |
| Final score | 50 | 46 | 10 | 74 |
| | | | | |
| Score | −51 | −47 | −10 | −74 |
| Adjustment Factor | 1 | 1.3 | 1 | 0.4 |
| Final Score * | 51 | 61.1 | 20 | 29.6 |
| Adjustment Rank | 2 | 1 | 4 | 3 |

Adjustment Factor Included, Final Rank Determined

Finally, the final score is multiplied by the Adjustment Factor (which is presumed to be 1, unless otherwise specified). The providers are then ranked from 1 to n based on this score. The top 3 are then matched to a project.

Profiling New Searchers—Conotive Matching System

Figure 31:
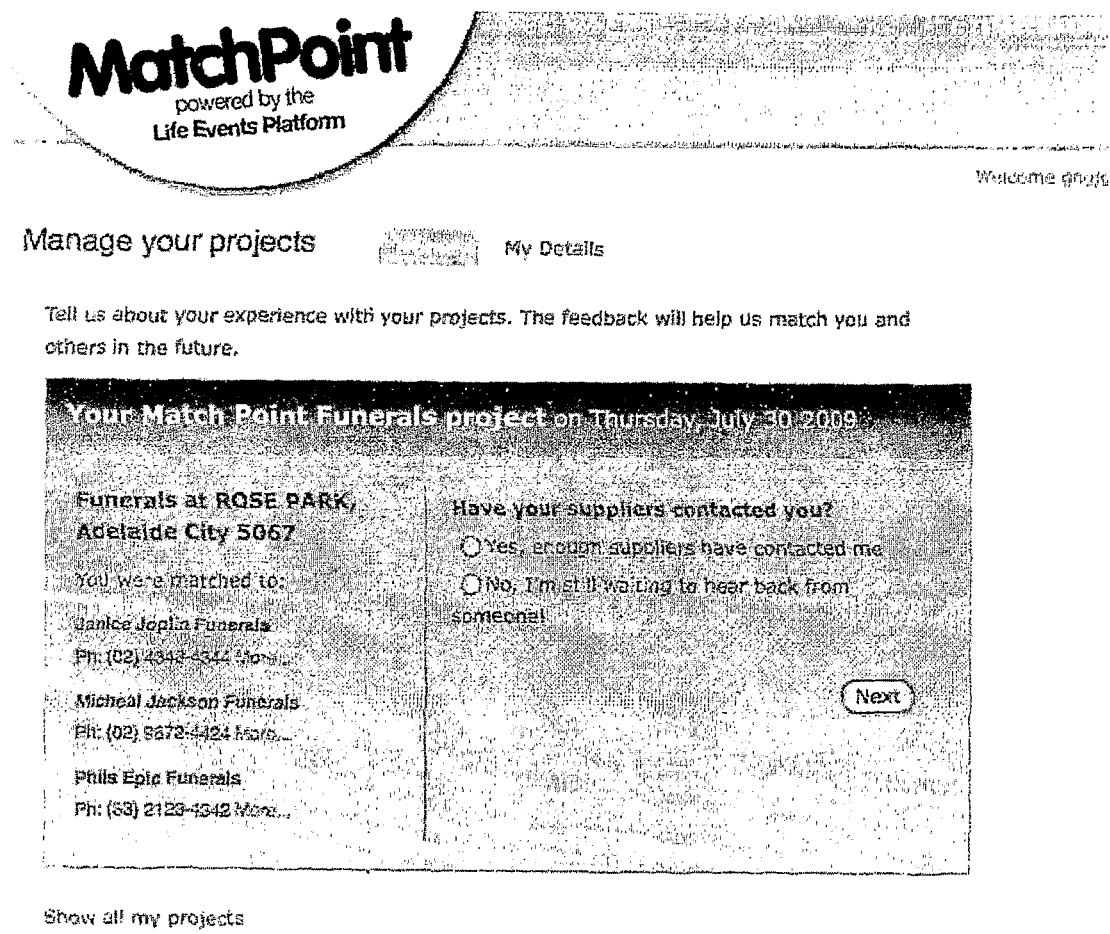
Figure 32:
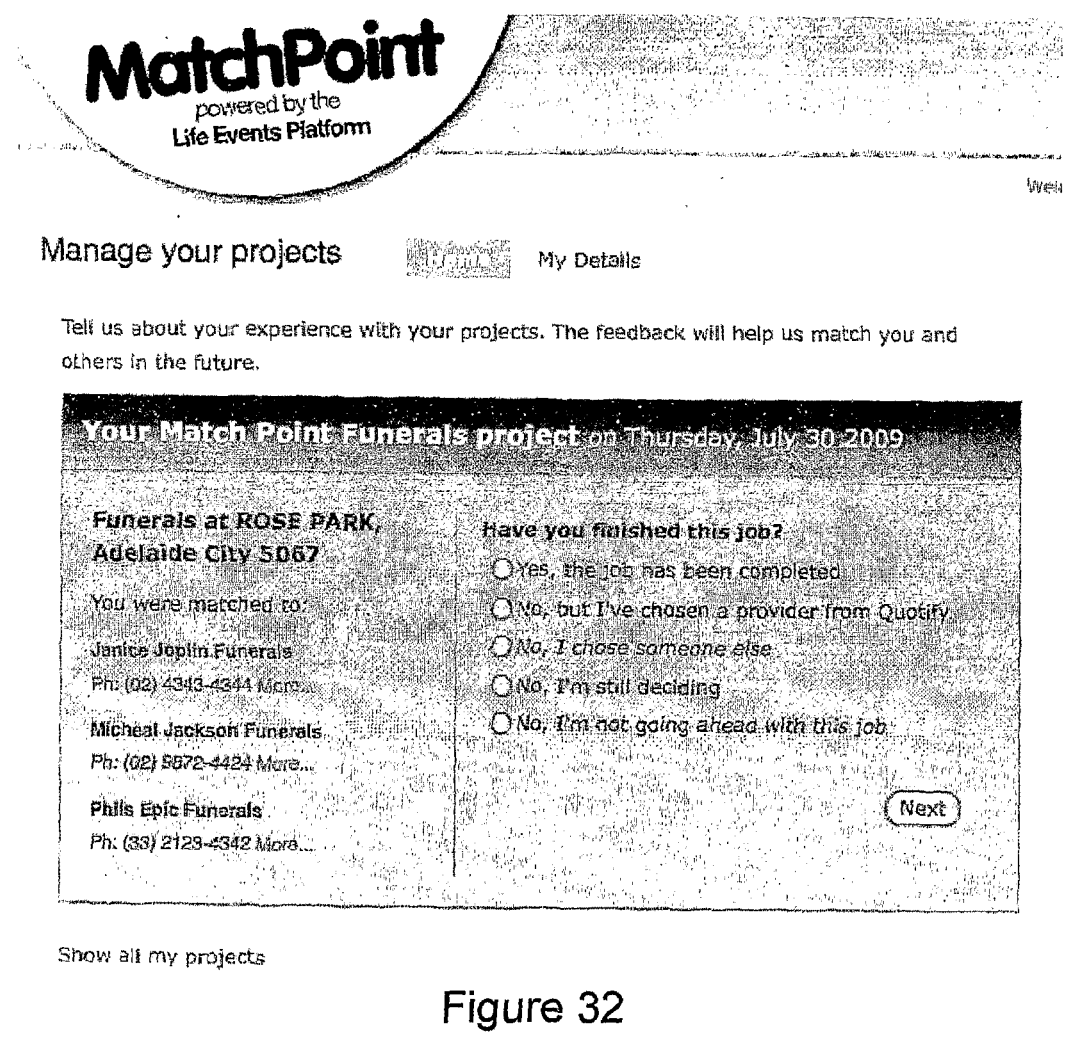
Figure 33:
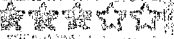

In some embodiments, the inventive subject matter provides a conotive matching system for determining and assigning a searcher to a Buyer Type (see FIG. 2, discussed in more detail below) based on acquiring relatively limited information about a searcher through an initial questionnaire, for example. Conotive matching may contribute to matching as a rank rule as described in the section above, or through a separate profiling step. For each Buyer Type, there are a default set of attributes, which may be weighted or unweighted, and assumed or assigned to be of importance to the searcher in matching to job, project or other subject of a search. The Buyer Type's default set of weighted or unweighted attributes allow creation of an initial Buyer Profile for the searcher. On subsequent uses of the system, a searcher's Buyer Profile may be refined according to further information. For example, the Buyer Profile may be refined based on the actual experiences of a searcher with service providers, such as may be collected and stored using post-transaction surveys with a searcher. For example, the Buyer Profile may be refined based on the actual experiences of a searcher with service providers, as could be collected and stored using post-transaction surveys with a searcher. One embodiment featuring such post-transaction surveys is shown in FIGS. 31-33. The Buyer Profile may also be updated according to information obtained from third parties. For instance, third party evaluators may include credit agencies that rate searchers and service providers; accreditation agencies; licensing entities; independent rating services; public forums, etc.

The following description is a representative contextual example and overview on how the process would work from the searcher perspective. It is presented to illustrate principles of the inventive subject matter, and therefore is not intended to be limiting.

1. A searcher wants to find a pest controller to remove ants from his house.
2. He searcher navigates his web browser to an online business directory, the Internet Yellow Pages ('IYP') for the first time.
3. He types in 'pest control' into the search box of the IYP.
4. He lands on a listings page with numerous paid and unpaid Pest Control companies listed.
5. The IYP has a widget on the right hand side or on top of the page, powered by an intermediary party operating a matching system. The intermediary party offers to:
   Match the searcher to 3 pest controllers that are available (e.g., have capacity) and service the searcher's area.
   Match to rated providers.

Figure 3:
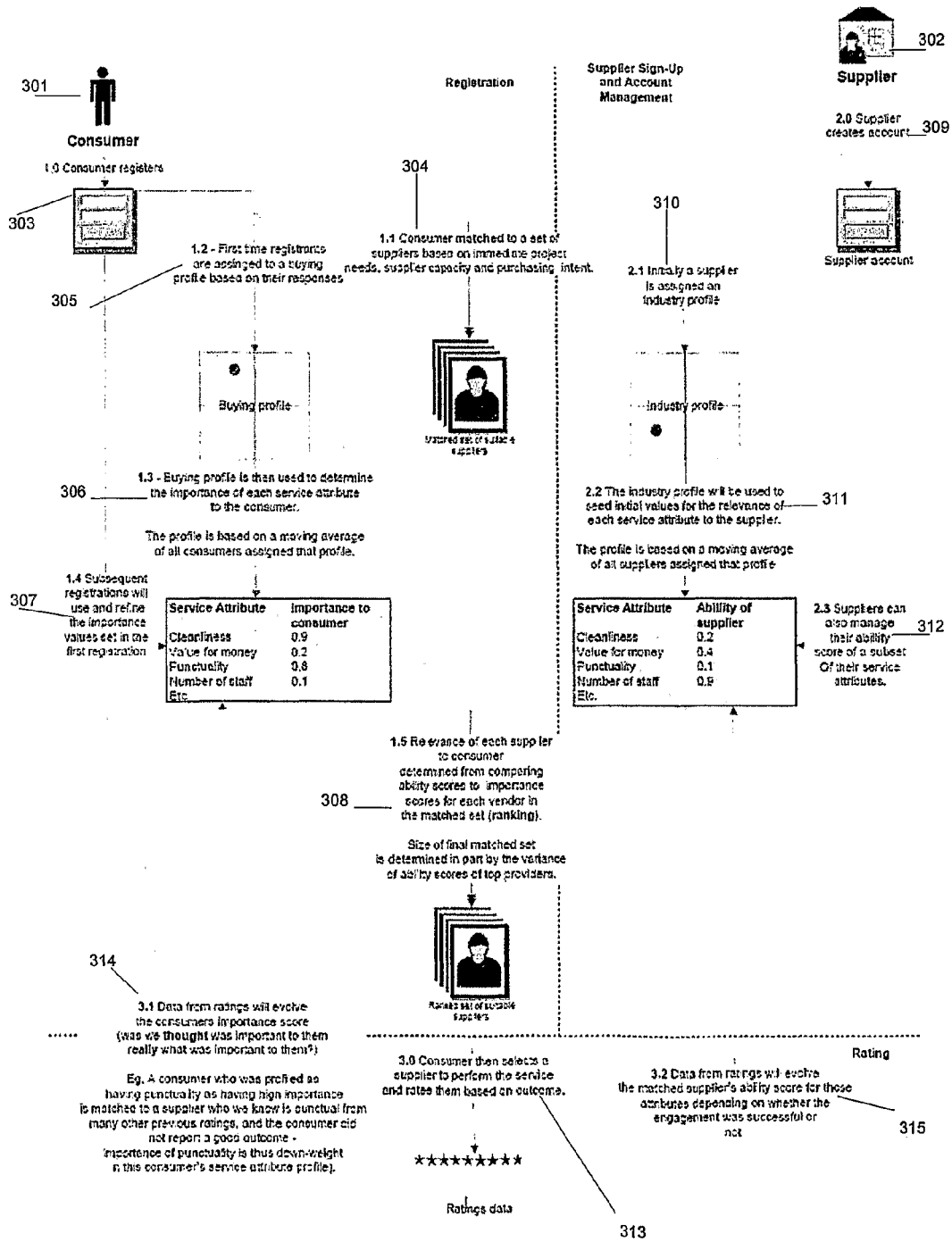
FIG. 3 shows an overview of a representative efficient matching system.

FIG. 3 is a Data Flow Summary that illustrates a flow of data from the consumer 301 and supplier 302 through the intermediary system. In the context of this example, this process initiates when a searcher engages with the IYP widget. That triggers a consumer registration process 303 used to gather data for matching.

In an initial matching step 304, certain business rules are applied to each vertical (and are often specific to each vertical) in order to filter and narrow down the set of providers that have the capability and availability to do the job or project within a searcher's interest. The filtering may be based on:
   Capability Questions: These questions are generally specific to each vertical and relate to these areas of typical interest in matches with service providers:
      Job Location.
      Product/service required (sub categories).
      Size and type of job required. and
   Availability Questions: These questions can be generally applied to all verticals and relate to these areas of typical interest in matches with service providers:
      Provider capacity—These questions relate to searcher intent and when and how quickly they need the service. They are then mapped to the provider ability to service the searcher, now, within 5 days, 1 month, etc. (Also See Premium Product service description below.)
      Responsiveness (for example, managed via measuring Provider 'Engagement' from an email sent to the searcher after 24 hours requesting feed back as to which providers have/haven't contacted them).
      Availability (for example, managed by the Provider, when ill, on holidays, too busy, etc).

Notably, the use of the foregoing availability attributes should help generate searcher confidence in the matching system and garner repeat usage of the intermediary party and IYP. In contrast, in conventional systems, after searchers find a good provider through an IYP, they often do not use the IYP the next time there is a need a provider for that vertical. Instead, they call the service provider direct. However, the searcher in doing so will not have the benefit of current profiling of the service provider for changes that might dictate against reuse of the service provider. With the inventive system, the searchers may be offered available and responsive providers on each occasion of need.

In combination with determining a set of capable and available service providers, the searcher is assessed to determine the service providers that can match closely the needs, interests and expectations of the searcher. This will allow for further identification or filtering of service providers. The system may use the information to rank 308 the service providers based on closeness of match. For example, they may be ranked to provide the searcher with the top providers in that vertical. In some embodiments, the searcher may choose the number of providers to be matched—this may be particularly helpful to the searcher when the variance between provider ratings is high (i.e., >2 standard deviations) for a particular vertical. (See http://www.columbia.edu/~ss957/nytimes.html.)

In 305, searchers are assigned to a "Buyer Type" that enables determination of initial attributes and values for a searcher's profile (e.g., a "Buyer Profile"), allowing for the system to more granularly determine matching and rankings. The typing of a searcher or other party may be implemented through a process called Conotive Profiling that indexes or maps an individual's own style of action. One online system enabling such mapping is found at http://www.kolbe.com. In general, a conotive profiling system is based on the premise that each individual (or entity) has an inborn, instinctive style of action. The instinctive styles are then characterized.

Figure 2:
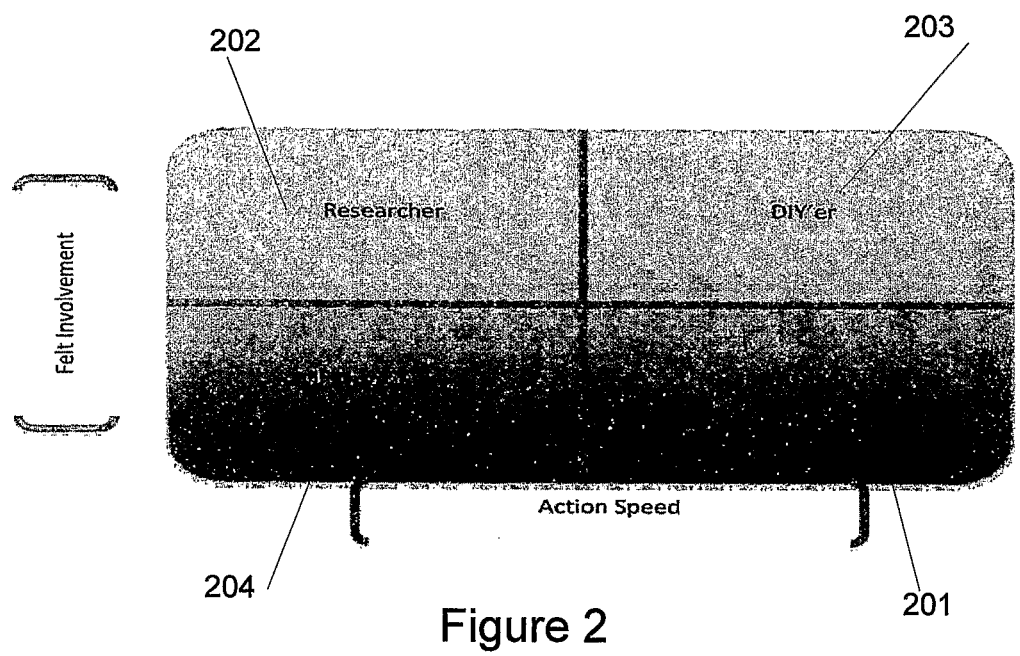
FIG. 2 shows an example of categories of instinctive styles or "Buyer Types" or "Service Provider Types," to which a searcher or provider may be assigned.

FIG. 2 shows one known profiling system where instinctive or inherent styles are mapped to four distinct patterns of action, i.e., different ways of doing things:
1. Quick Start: If you're a Quick Start who wants to crochet, you'll probably buy some yarn and a hook, get a few tips from an experienced crochet expert, and jump right into trial and error. A "JUST DO IT" Buyer Type 201
2. Fact Finder: You'll spend hours reading, watching, asking questions, and learning about crocheting before actually beginning to use the tools. A "RESEARCHER" Buyer Type 202.
3. Implementor: You pay less attention to words than to concrete objects, so you might draw a pattern of a crochet stitch or even create a large model using thick rope, before you go near a needle. A "DIY'er" Buyer Type 203.
4. Follow Thru: You'll likely schedule a lesson with a crochet teacher or buy a book that proceeds through a yarn curriculum, learning new stitches in order of difficulty. A "MR THOROUGH" Buyer Type 203.

A Buyer Type may be established in a variety of ways. In some embodiments of the inventive subject matter, the searcher may be presented a series of questions to establish their instinctive style relative to a set of characterized instinctive styles, i.e., their Buyer Type. These questions may be direct, such as whether a searcher prefers to make a snap decision or do extensive research before making a decision. The questions may also be indirect, such as brand affinity. For example, a brand affinity such as a type of car may be used to infer a Buyer Type. More careful purchasers may like a Volvo, while a more style-conscious consumer may like an Acura. Questions may also be based on statistical not causal correlations. For example, dog owners may be most likely JUST DO IT Buyer Type, while cat owners may be most likely MR THOROUGH Buyer Type.

Some questions may be optional. This would allow searchers to proceed through establishing a Buyer Type very quickly, at the expense of a more accurate match. Use of optional questions allows the searcher a way to balance the value of their time with their needs around a more detailed match.

To establish a Buyer Type for a given searcher, a set of existing characterized instinctive styles from a conotive process may be used, such as those defined above, or a set may be determined from a custom effort to characterize instinctive or inherent styles. In some embodiments of the inventive subject matter, the searcher may be presented a series of questions to establish their instinctive style relative to a set of characterized instinctive styles, i.e., their Buyer Type. These questions may include, for example:

Benefit related questions, for instance:
 Q1. Select your most appropriate outcome;
  a. really want to get the job done fast.
  b. I'd like the provider to turn up on time.
  c. I want to know exactly what he is going to do and when.
  d. Etc.

Assessing Buyer Type may done exclusively. For example, each searcher may be considered to have one and exactly one Buyer Type. For exclusively assigned Buyer Types, a strength may or may not be associated. For example, a Buyer Type may simply be assigned, or a Buyer Type may be assigned with a qualitative strong/weak, a numerical strength quantifier such as 70%, and/or a confidence level for that Buyer Type such as 80%. Some embodiments may assess a searcher as having a mix of different Buyer Types in combination. For example, a total score of 100% points may be allocated between discrete Buyer Types. A searcher may be 38% DIY, 28% RESEARCHER, 21% JUST DO IT, and 13% MR THOROUGH. In one embodiment, these scores may be collected through a number of questions, where each answer is associated with a particular Buyer Type and the aggregate fraction of answers provides an allocation of percentages. Another embodiment may establish an allocation of Buyer Types with each answer, thereby summing the allocation over all answered questions provides a total allocation of Buyer Types.

A Buyer Type may also be assessed based on external data from another provider. For example, spending information such as from a credit report, charge card history, or customer loyalty card may provide data about purchasing habits in the form of aggregate spending, individual purchases, brand affinity, or socio-economic class. Preference information from online ad networks may include self-identified data provided voluntarily by a searcher or information derived from clicking online ads, using particular search terms with a search engine, or opening a promotional email containing a tracking device such as a web bug. Affiliates may provide referral information. For example, a "referer" field of the HTTP header may be provided based on the last web site visited. If the last web site is, for example, a personal finance site, a Buyer Type of MR THOROUGH may be inferred. Alternatively, an affiliate may provide profile data about its users that may be used to determine a Buyer Type. In addition, a previously established Buyer Type for a different vertical or need may be relevant to determining a Buyer Type on a future site visit.

Each Buyer Type (see, e.g., FIG. 2) has associated with it, a set of provider attributes that are weighted to that Buyer Type. For example, all Buyer Types may have 'Price' as an attribute associated with it; however, some Buyer Types will weight the importance of Price lower than other Buyer Types. Also, each Buyer Type will only have attributes that are weighted at all, if they relevant to that industry (e.g., pest control).

In addition to establishing a Buyer Type, further data resources can refine attribute ratings beyond a Buyer Type. For example, in the question-based embodiment above, a number of questions could establish a searcher has a Buyer Type of MR THOROUGH. This corresponds to a particular attribute weighting. Additional questions could further refine attribute weightings beyond the Buyer Profile. These additional questions could be made optional for the searcher to answer voluntarily.

In one embodiment, for processing efficiency, or to not overburden the searcher, there are no more profiling questions than necessary to assign a searcher to a Buyer Type. For example, four profiling questions may be suitable to determine a Buyer Type for a searcher. The questions generally should be non-linear based on the answers, taking into account the previous profiling questions. The system may employ any number of Buyer Type categories to achieve a desired granularity of matching. In this example, there are four Buyer Types, and each Buyer Type:

Will have associated with it, the universe of provider attributes that are weighted to that Buyer Type. For example. All Buyer Types may have 'Price' as an attribute associated with it; however some Buyer Types will weight the importance of Price lower than other Buyer Types.

Will only have attributes that are weighted at all, if they relevant to that industry (i.e., Pest control).

Notably, the Buyer Type profiling method need only be used for first time users of the matching system. After an initial use, the system will build an attribute, attribute rating and attribute importance Decision Matrix (see below) for each searcher 306 or service provider. This evolving, searcher Decision Matrix will be used for a party's future provider-matching requirements 307.

Once the searcher is given a Buyer Type, the searcher is given a set of default attribute values of assumed importance to searchers in the Buyer Type. As indicated, this creates an initial Buyer Profile for the searcher. The Buyer Type default attribute values keep evolving from the current attribute Decision Matrix of previous searchers that have been allocated to the searcher's Buyer Type, which will be matched to the Provider Profiles (see below) in order to find the set providers who meet searchers' criteria 308.

After the system initially determines, or is programmed with a model of the relevancy of an attribute to the industry or sub category, the model may then be automatically revised and updated based on feedback (such as from ratings) from the provider or searcher.

Profiling Service Providers

The inventive subject matter is not limited to categorically typing and establishing an evolving profile for the searcher. There are inventive advantages for performing parallel typing and profiling steps for the service provider. Significant advantages in efficient matching may be achieved when the steps are performed for both parties to be matched, but in some embodiments, the steps need only be performed as to one party or the other. The following is an overview on how the process would work from the service provider perspective:

A service provider (which may also be referred to as a "provider") registers with the matching service offered by an intermediary party 309, using, for example, an online form. The form has the following two qualifying matching elements that can be mapped to those used with the searchers:

Capability Questions: These questions are generally specific to each vertical and relate to these primary areas:
 Job Location.
 Product/service deliverable (sub categories).
  Top <3> areas of specialty—these specialties should be up-weighted in the Capability matching process.
 Size and type of job deliverable.

Availability Questions: These questions can be generally applied to all verticals and relate to these primary areas:
 Capacity—What is the ability and facility of the business to complete work in a particular industry over and/or during a particular time period. For example, a plumbing business may employ two teams, each of which can service on average 3 large plumbing jobs per day. The capacity of this business is therefore 6 large jobs per day. Capacity may be refined in particular industries to include capacity for particular specialist work, or types of job within a particular industry. For example, the ability of a fencing contractor to construct wire fencing may be different from their capacity to construct glass fencing.

In one possible embodiment, the capacity may be managed by how the service provider spends on leads. Given that service providers may not have a means of relating spending to their work capacity, the system may employ a Capacity Calculator which broadly calculates service provider capacity from inputs (which they input), such as number of workers, average job size, number of jobs per month, estimated lead to sale conversion rate, etc. Optionally, for each lead sent to service providers the system could query whether they want More (M) or Less (L) of this type of lead. For example, 'M' or 'S' could be texted/emailed back to the intermediary party's system to further refine capacity for the leads by area, vertical, sub category, specialty, etc. . . . and (possibly) service provider requirements. Another option could be to give service providers the ability to accept or reject leads, via SMS or email, whereby they pay one price for receiving/subscribing to the lead alert, and another, greater, price to the accept the lead. The searcher can then be sent a message, notifying them that their job has been accepted by the Provider (Note: this can be done by the method previously described, above, as well).

If the system determines that a service provider is too close to its capacity, the service provider can be excluded from matching sets of leads. This could be based on not listing the service provider on a matching set provided to searchers and/or not offering the service provider a set of leads.

Availability—the willingness of the business to act in furtherance of job or project (e.g., accept requests for new work, provide information, etc.) at a particular point in time, and to set limits on the number/quantity of requests for work, and the type of work that is requested. For example, this aspect may be managed by the service provider. Here the service provider is able to restrict the amount and frequency of leads sent to them in a given time period). This criterion may also be used to determine if the provider is financially sound or in credit to continue to pay for leads.

Responsiveness—the speed and efficiency to which a provider will respond to requests for particular types of work. For example, the system could have a service provider interface that shows service providers their responsiveness ranking versus their capacity profile, in order to show them where they might have the facility to increase or decrease their Capacity/Spend.

Similar to the process of assigning a searcher to a Buyer Type to establish an initial Buyer Profile, the service provider may also be assigned one of a predetermined number of Service Provider Types to establish an initial Service Provider Profile. In FIG. 3, the step of service-provider typing is indicated at "Industry Attribute Template" 310. Each Service Provider Type would have a set of attributes and values relevant to matching.

Each Service Provider Type may correlate with one of the Buyer Types shown in FIG. 2, for example 305 and 310 illustrate a pair of correlating Buyer Type sets and Industry Attribute Template sets to which a searcher and service provider are respectively assigned. A pair of correlating Buyer Types and Service Provider Types would therefore indicate the possibility of a good match between the searchers and service providers assigned to each type. The searcher, as indicated by the dot in the upper-left quadrant, is assigned to a different (non-correlating) quadrant from the service provider, who is assigned to the lower-left quadrant. This indicates a less than ideal match.

A profile for a service provider (or a searcher) may also be created or updated directly, with or without use of a typing process 311. For example, each service provider may be asked to choose, for instance, the ten or twenty most appropriate/important attributes (which may be called 'Selling Propositions') from an Attribute Universe (see below discussion on Attribute Universe). From this list of ten attributes, they are asked to rank, in order of importance, the top five most important attributes of their business over others in the industry. In one possible scenario, the service provider would be asked to choose a suitable number of his key selling propositions from a list with a larger number. The ones selected may be allocated to the service provider's industry via allocating the industry to an Industry Attribute Template (discussed in more detail below). For example, this might be done via a matrix of industry searcher decision complexity versus number of competitors in the industry, in which industries are mapped, and depending on their weighting, are allocated the a suitable number of most appropriate (to their weighting) attributes. This might be achieved through direct questioning of the provider, or through alternative survey methods. For example, one embodiment uses conjoint analysis. Conjoint analysis is described in U.S. Pat. No. 6,826,541 to Johnson et al. titled "Methods, systems, and computer program products for facilitating user choices among complex alternatives using conjoint analysis" and is hereby incorporated by reference in entirety for all purposes.

Suppliers can also manage their ability score of a subset of their service attributes 312. Suppliers can directly select a particular Buyer Type to cater to. Alternatively, suppliers can enter their attribute weightings to self-identify the characteristics of their business. However, suppliers cannot affect the ratings provided by other searchers.

Further example embodiments are shown in FIGS. 31-35.

Service attributes, also known as searcher provided ratings, are gathered from the searcher. FIG. 31 shows possible user interface for assessing whether suppliers have contacted a searcher. If enough providers have contacted a searcher, meaningful information about the progress of a job may be gathered in later steps. If enough providers have not contacted a searcher, a followup communication may be issued to the provider or the provider's timeliness service attribute may be decreased.

FIG. 32 shows a user interface for collecting information about progress of the job. Different options are presented including job completion, choosing a provider within the system, choosing a different provider from outside the system, undecided whether to proceed with the job, or deciding not to go ahead with the job. If the job has been completed or a provider from within the system has been chosen, feedback about the provider may be obtained.

FIG. 33 shows quantitative feedback about the provider, directly gathering a number of service attributes. The service attributes represented here are quality, budget, communication, value, timeliness, courteous, cleanliness, and textual feedback. This textual feedback may be scanned for keywords, processed programmatically for tone, or to obtain information about the searcher. Service attributes shown are merely one embodiment. Other embodiments can use other service attributes including a subset of those listed above or additional attributes that related to the searcher's satisfaction, experience, or preferences. The example shown allows quantitative feedback including integers from 1-5. Other ways of collecting feedback may use a graphical slider, a percentage rating, qualitative feedback such as thumbs up/thumbs down, or any other method of assessing feedback.

FIG. 34 shows a user interface for viewing consumer feedback as well as the status of issued feedback requests. This interface may allow additional prompting to be issued for users that have incomplete feedback. This interface may also calculate statistics about the feedback issued such as ratio of providers within the system versus outside the system.

FIG. 35 shows a sample feedback summary for a particular job. FIG. 2 shows a matrix of Buyer Types. With each Buyer Profile having a set of attributes and associated weightings, the system can use the data and any service provider specified attributes to rank the most appropriate providers specifically for a first time searcher. For example—the searcher has answered questions that define them as a RESEARCHER Buyer Type, which has attributes like communication, industry knowledge, quality, etc associated with it. Service Provider A has input that he believes industry knowledge and quality work are his 2 key attributes selling propositions to searchers, while Provider B likes to position his business on price and speed. The system may now determine that Provider A is a better match 308 for a searcher who is a RESEARCHER.

B2B Contexts

In other contexts, such as B2B matches, the matching and ranking processes may also include business attributes or objectives (KPIs, such as EBITDA, Net profit, gross margin, revenue, costs, etc.). For example, a provider may bias a matching algorithm to pass leads to a channel partner who provides the highest gross margin to them.

Profiling Industry Categories (Verticals)

In addition to profiling buyers and providers, the system may also profile industry categories for matching with buyers based on the actual or expected needs of the buyer. Once there is a match with an industry category (vertical), the buyer may be further matched with providers in the category. The Industry Capacity Profile concept enables a way to promote (via email messaging, contextual ads, smart widgets, etc.) one industry over another in order to increase yield (primarily through increased propensity for conversion). Some Industry Capacity Profiles may be particularly relevant for a particular date range or season. For example, this could be done by promoting pest control services in the summer, tax accountants at the end of the financial year. At those times there is there are expected to be higher conversion rates. An Industry Capacity Profile would therefore include attributes related to demand for services according to season, any historic demand fluctuations and/or any changes that relate to industry pricing, supply or dynamics. Accordingly, the inventive subject matter may include novel embodiments using an Industry Capacity Profile that helps optimize yield when deciding what vertical/verticals to select from, or rank, for yield or revenue optimization.

The Post Registration Process

In some embodiments, the inventive subject matter may provide that after the first time searcher and un-rated provider have been matched, the following process may occur: The searcher is asked to rate the providers that were matched to—including the one they eventually choose 313. The two primary objectives of this process are to:

Refine the attribute importance profile for the searcher. The attribute importance will be aggregated for all providers in that vertical and, separately, the verticals' sub-categories, so that it will become one of the primary inputs into calculating future attribute weighting for that vertical and sub categories.

Refine the provider attribute ratings for the key attributes.

Assess the success of a previous match, and from this also refine the attribute profile for the searcher and provider.

The system may use both the attribute importance and attribute ratings in the refining the data in the searcher's attribute Universe 314, in total, and for each of the Buyer Profiles, so that the system is able to make assumptions from the data and perform functional examples, such as the following:

If searcher A rated certain attributes important for a pest control job, and has a given Buyer Profile, then Searcher A should like certain service providers for a plumbing job.

If pest control Searcher A has a given Buyer Profile, and rated certain attributes as important, and New Searcher B has a similar Buyer Profile (but has yet to rate a service provide), then searcher B may also like similar well-rated providers within the category.

Based on a searcher's Buyer Type, the system can make some assumptions about which attributes are important to the searcher. The system could give the searcher a list of the top ten attributes for his Buyer Profile (for that vertical) and ask him to choose five that are most important to her—each attribute 'ticked' is a vote for the importance of that Attribute. The system could also ask the searcher to rate the top attributes for that vertical's sub-category. The searcher could then be asked who they choose or did not and why. Based on the ratings data provided by the searcher, and the success of the engagement, the system may up-weight or down-weight the profile of a service provider 315.

Figure 18:
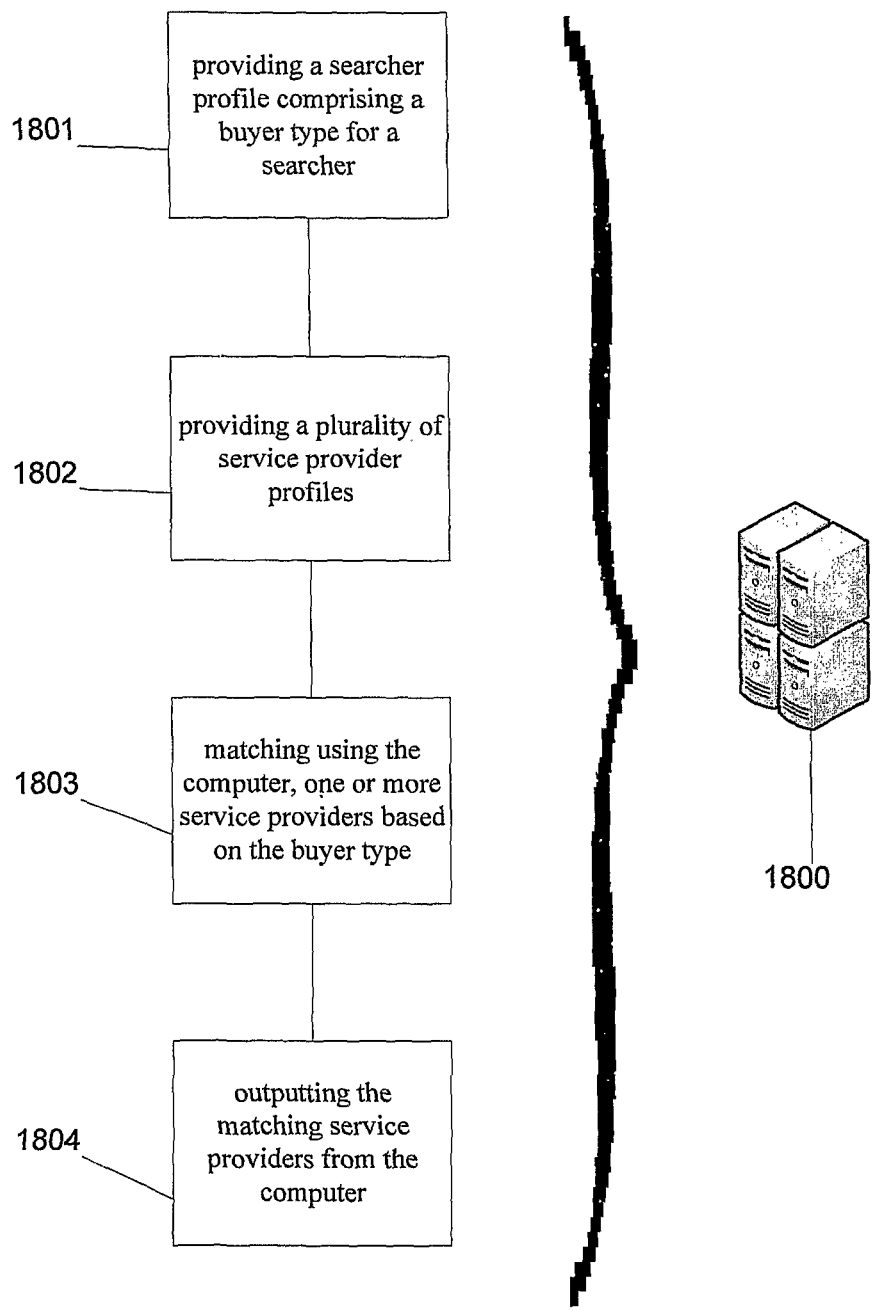
FIGS. 18-20 show different embodiments of the inventive subject matter.
Figure 19:
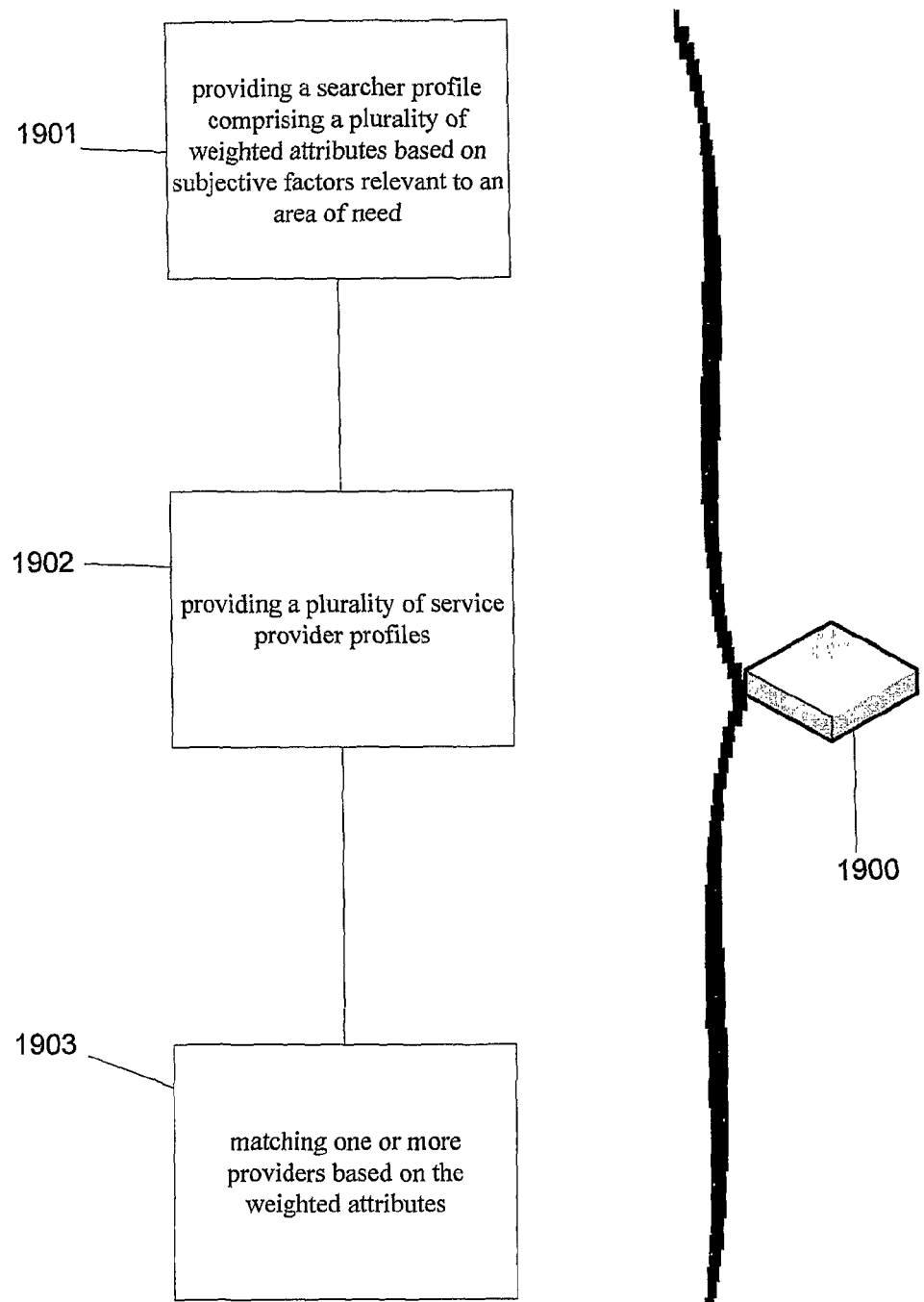
Figure 20:
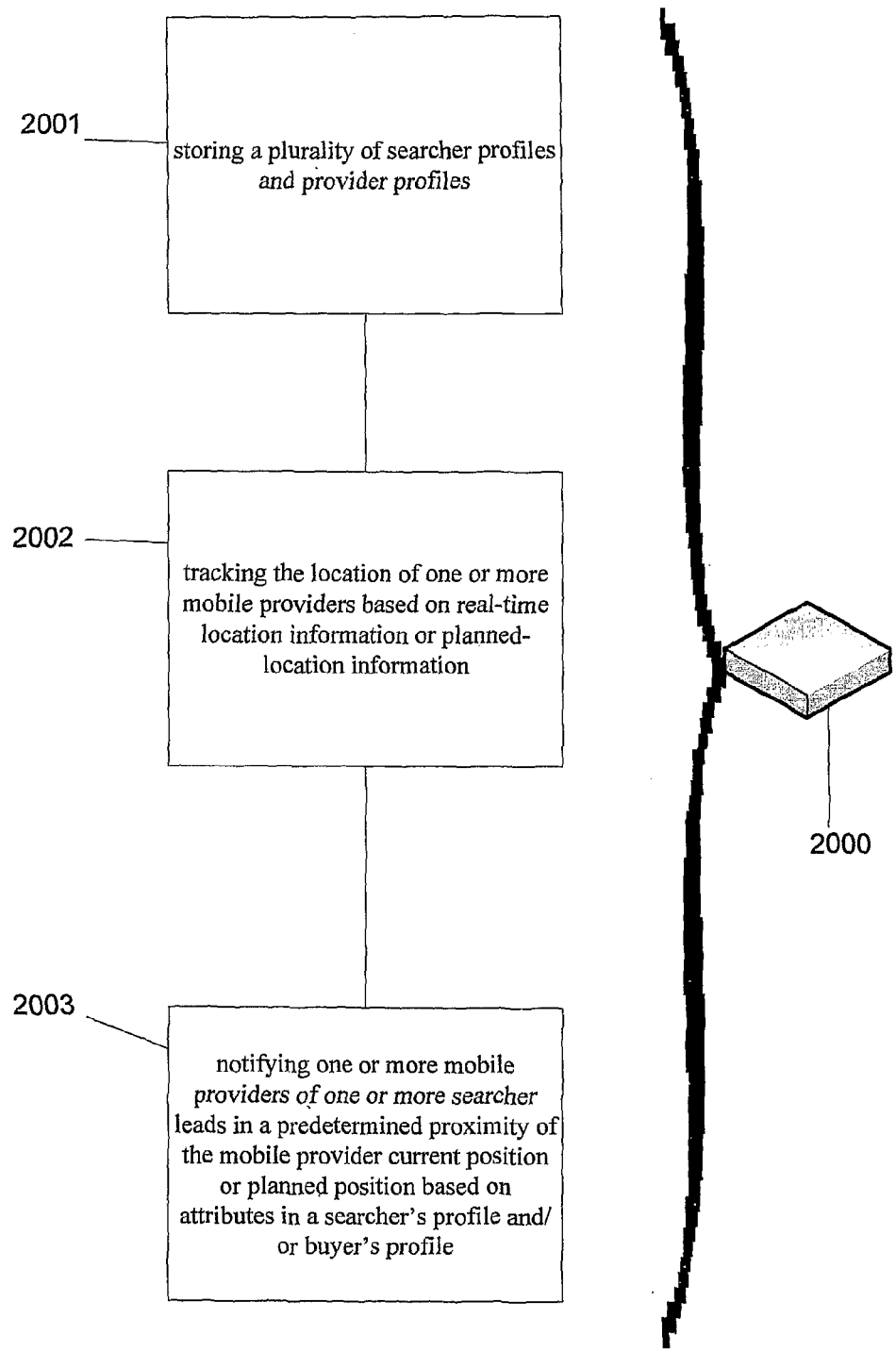

FIGS. 18-20 show different embodiments of the inventive subject matter.

FIG. 18 shows a computer 1800 implementing one embodiment of the inventive subject matter as a computer-implemented method of determining matches between searchers and providers, comprising providing a searcher profile comprising a Buyer Type for a searcher 1801, providing a plurality of Service Provider Profiles 1802, matching using the computer, one or more service providers based on the Buyer Type 1803, and outputting the matching service providers from the computer 1804.

FIG. 19 shows a tangible, computer-readable medium 1900 containing computer-executable instructions for determining matches between searchers and providers, comprising providing a searcher profile comprising a plurality of weighted attributes based on subjective factors relevant to an area of need 1901, providing a plurality of Service Provider Profiles 1902, and matching one or more providers based on the weighted attributes 1903.

FIG. 20 shows a tangible, computer-readable medium 2000 containing executable instructions for matching in an intermediary matching system, comprising storing a plurality of searcher profiles and provider profiles 2001, tracking the location of one or more mobile providers based on real-time location information or planned-location information 2002, and notifying one or more mobile providers of one or more searcher leads in a predetermined proximity of the mobile provider current position or planned position based on attributes in a searcher's profile and/or buyer's profile 2003.

Mobile Applications

In some embodiments, the inventive subject provides for mobile applications that improve exchange of data and communications among the intermediary party and other parties to be matched. In one possible embodiment, the system provides for real-time or other dynamic changes to system user interfaces based on changes in searcher or service provider attributes. For example, searcher input form content, and/or questions asked on the intermediary website, may be modified to map new information to the searcher or provider's attributes of importance, and/or other attributes, such s their location. Location could be determined from the GPS location on the mobile phone or as specified by the provider. Availability could be determined, for example, by using the system to track the status of a service provider's project, or dynamically tracking a service provider's status via an application on the service provider's phone or other mobile device. For example, if the system learns that there is or will be a service provider in a given area of one or more searcher, the system could dynamically alter the form (e.g., to be longer/shorter/different questions) to address: the location and availability of a service provider in view of the assumed or known needs of one or more searchers in the area.

In instances where the system cannot pre-identify where the searcher is, their immediacy requirement, and/or other relevant attribute, the system may ask them early in the form, and the form content may then change based on the that information and the service provider's GPS location, for example.

Based on registration data, the system may be used to identify a pool of searchers that could be the basis of group or other special discounts or offering. For, example, the system could geo-map all members so that neighboring members may be contacted (e.g., via phone, email, SMS) by the intermediary party and/or an intermediary partner (such as an Internet Yellow Pages) and informed that a local neighbor has, for instance, a Carpet Cleaning service provider coming on a specific date. This could be inferred from existing data or determined from an application on the mobile phone, e.g., the use of a mobile phone application to determine a service provider's availability and/or capacity to take additional work within a time period and/or within the next day/week/month, as may be within a searcher's specified needs. The offer to these neighbors could be, for example, whether or not they receive a discount from the service provider should they agree to have work, done on, or around, that date. In other embodiments, the system may allow the service provider to initiate a location-based offering online, whereby the system is configured to allow them to pass their offers to opted-in neighbors of new members in the weekly email mentioned below. There could be a subscription or other fee to the service provider for this option. In other options, members may be asked if they will recommend a service provider to other members who are in the surrounding area.

In other embodiments, the system may map the opted-in service providers' locations via GPS, or according to a planned route schedule, and provide this location data to searchers. For example, the searchers could be sent a user interface that shows locations of nearby service providers and associated ratings. The map could include select/check boxes so that service providers are automatically invited to accept a paid and/or unpaid meeting with the searcher on the same day and/or within a set time. The service providers could be notified by an application on their mobile phone.

The service providers capacity for immediate work (as opposed to just a meeting) could be gathered from the intermediary party's mobile application, which the service providers would update, and searchers would then be able to bid on/request a paid and/or unpaid job request. This could be accepted or rejected by service providers. The first service provider to accept the immediate job request would win the job.

In another possible embodiment, the system could be based on a reverse auction: leads are sent to some or all service provider in a given area. The first person to connect pays, e.g., $4, the second $6, etc., until the price point exceeds that which someone is willing to pay for the lead. Thus, the fee for each service provider increases monotonically for each service provider to agree to pay the fee. Leads could also be prioritized on other factors, such as ratings of service providers in the area, or their financials. In some embodiments, the service providers may be placed into one of two groups: (1) Financial (e.g., paid-up) and (2) Non-Financial (no credit-float left in their account). Different pricing schemes might be offered to each.

In some embodiments, the system could send a notification, such as a weekly electronic message to searchers about which service providers will be in their area in the next week/month and that they will receive location-based discounts from those providers. In other embodiments, the system could provide "heat maps" of work availability by location and the map or information derived from a mapping would be made available to providers. The map may be customized so that it is specific to matching profiles of providers, e.g., who has the ability to do the work and who is or will be in the region of a mapping. The mapping information need not be in the form of a map but could be, for example, a message to a provider from the intermediary computer system that "there are 4 submitted plumbing leads for postcode 90210 in the past 5 hours not picked up, do you want to take them?."

FIGS. 4-12 show a graphical user interface for a mobile device used in accordance with various embodiments described herein.

Figure 4:
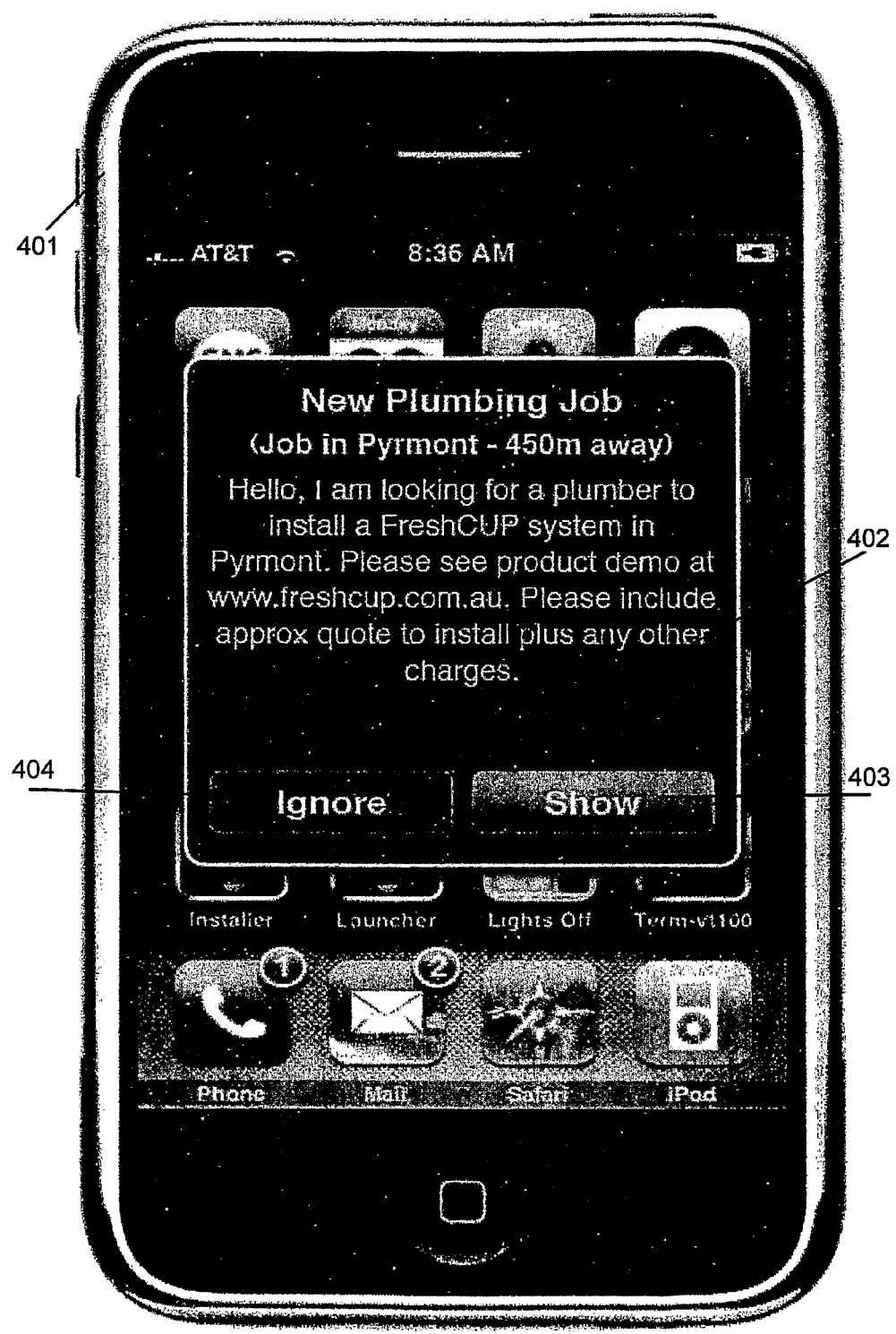
FIGS. 4-12 show a graphical user interface for a mobile device used in accordance with various embodiments described herein.

FIG. 4 shows one possible implementation of the graphical interface for displaying new leads from a location-aware searcher. Here the service provider's location is determined via location-enabled smartphone 401. The searcher's location is pre-identified by address during the consumer registration process 303. The inventive subject matter calculates the distance between the service provider's current location and the searcher's location. This distance is used as a supplier attribute 10 factor in matching step 7 for service providers. In addition, the lead is presented on the smartphone to solicit a realtime quote 402. The service provider may then elect to either show 403 more information or ignore 404 declining the lead.

Figure 5:
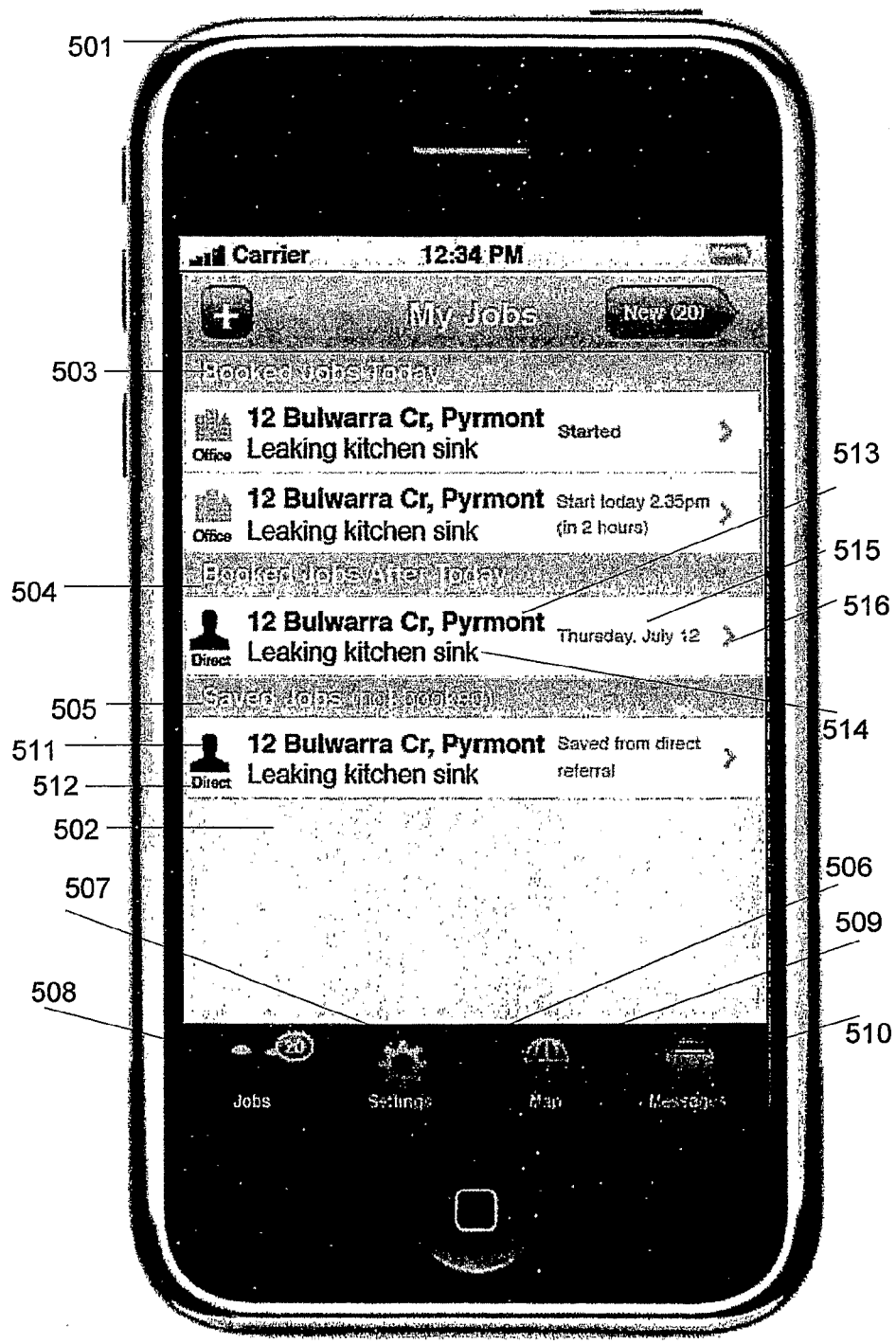

FIG. 5 shows one possible implementation of the graphical interface to assist the service provider in managing jobs. A smartphone 501 may or may not be location-aware. A graphical user interface is shown here as a smartphone application 502. This graphical interface shows Booked Jobs Today 503, Booked Jobs After Today 504, and Saved Jobs (not yet booked) 505.

The graphical interface may also provide a navigation mechanism such as an icon bar 506. The icon bar, as shown, includes a settings icon 507, a jobs icon 508 with an indicator of how many jobs are listed, a map icon 509, and a messages icon 510.

Each of these job items may include information such as a name 511 and avatar icon 512, a job address 513, a short text description of the job 514, a starting date 515, and a job detail link 516, shown as an arrow here.

Figure 6:
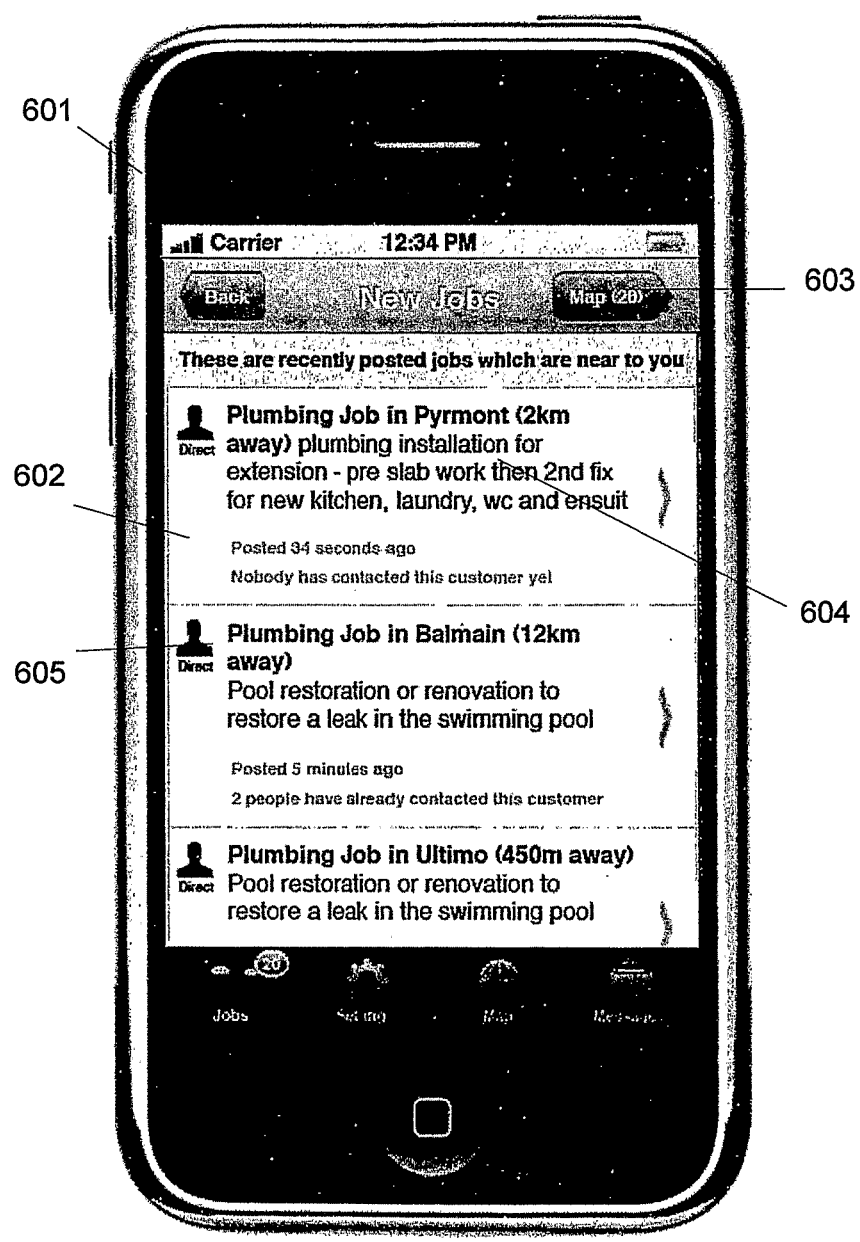

FIG. 6 shows one possible embodiment where a smartphone application provides a graphical user interface to show recently posted jobs for service providers. A smartphone 601 may or may not be location aware. A graphical user interface is shown here as a smartphone application 602. The interface provides a map where recently posted jobs are displayed 603. If the smartphone is location aware, the current location will be displayed on the map as well. The interface also provides a listing and brief, summary text description of recently posted jobs 604. Furthermore, the application may identify the source of the lead via name and/or representative icon or "avatar" 605.

Figure 7:
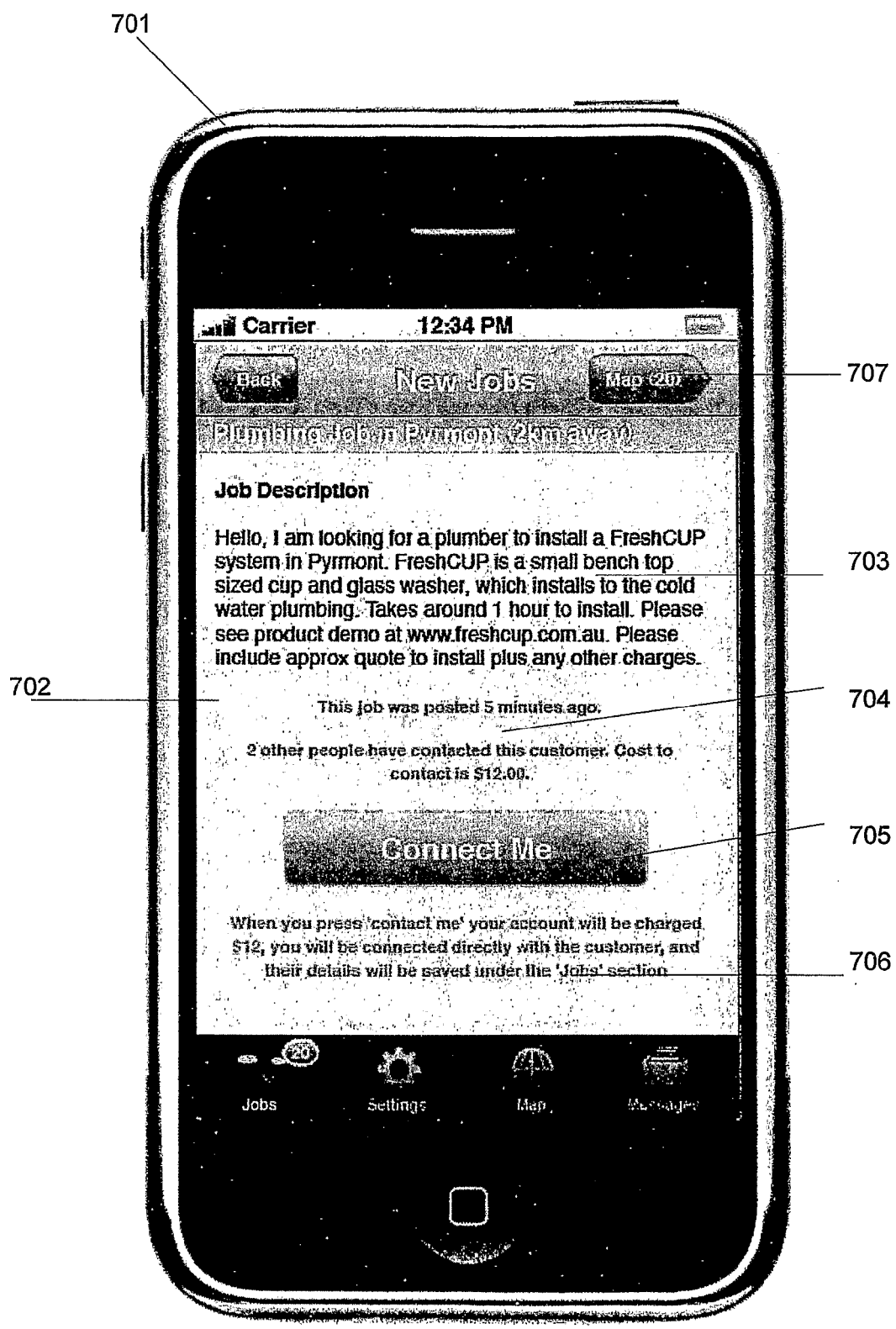

FIG. 7 shows one possible embodiment where a smartphone application provides a graphical user interface to show recently posted jobs for service providers. A smartphone 701 may or may not be location aware. A graphical user interface is shown here as a smartphone application 702. The interface provides a map where recently posted jobs are displayed 707. If the smartphone is location aware, the current location will be displayed on the map as well. The interface also provides a detailed text description of the job 703. Status information 704 may be provided to show how long ago the job was posted. Status information 704 may also include how many other service providers have contacted the searcher. Status information 704 may also include how much it will cost to be connected to the searcher. The application provides a Connect Me button 705 that enables communication between the service provider and the customer. This connection may be real-time such as an immediate audio voice connection via a cellular voice network or a voice over internet protocol (VOIP) connection through Skype or session initiation protocol (SIP). This connection may be realtime such as an immediate chat session. This connection may be asynchronous and passive such as providing contact phone or email information to the service provider. Finally, the application may provide licensing, contract, or usage terms 706.

Figure 8:
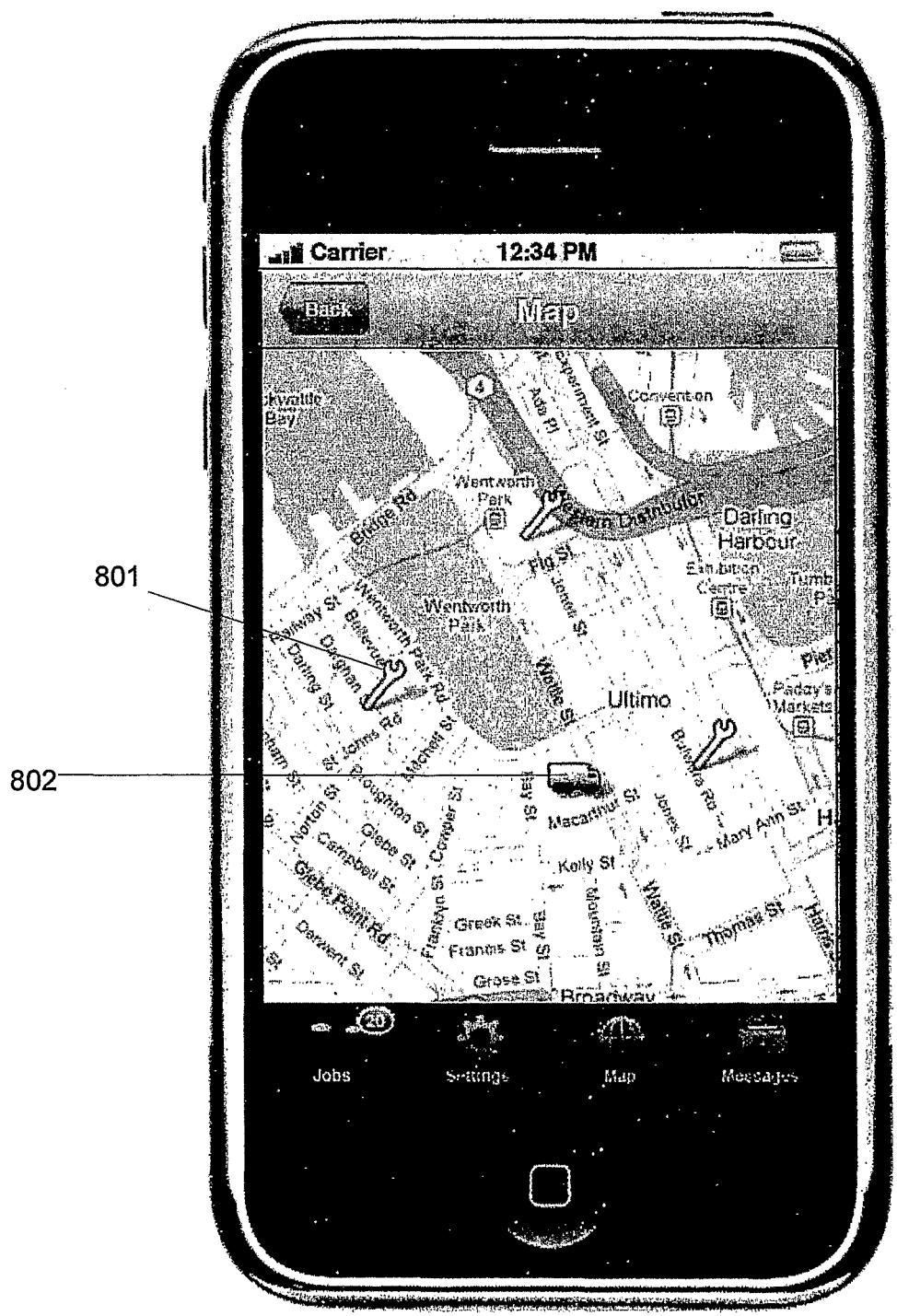

FIG. 8 shows one possible implementation of the graphical interface displayed after pressing a map button such as 509, 603, or 707. This map displays one or more job locations 801, here signified as a wrench icon. As shown, the interface is displayed on a location-aware device which displays the service provider's current location 802 as a truck icon. The map display may be scrollable or may allow accelerator keys to center the service provider's current location and/or cycle through the jobs.

Figure 9:
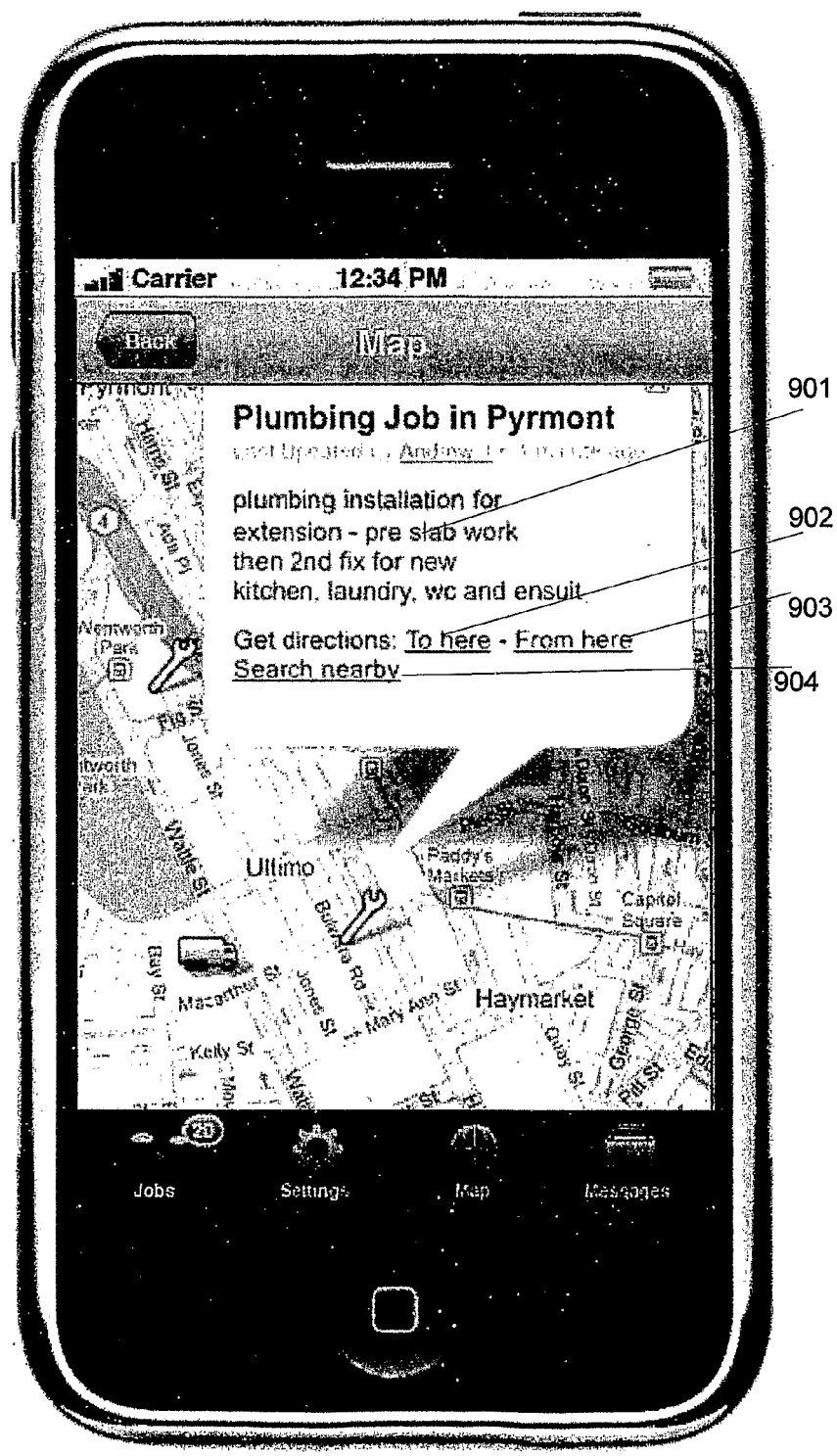

FIG. 9 shows one possible implementation of the graphical interface displayed if a job location icon such as 801 is selected. The interface may include a short text description 901, links to directions to 902 or from 903, and a link to search 904.

Figure 10:
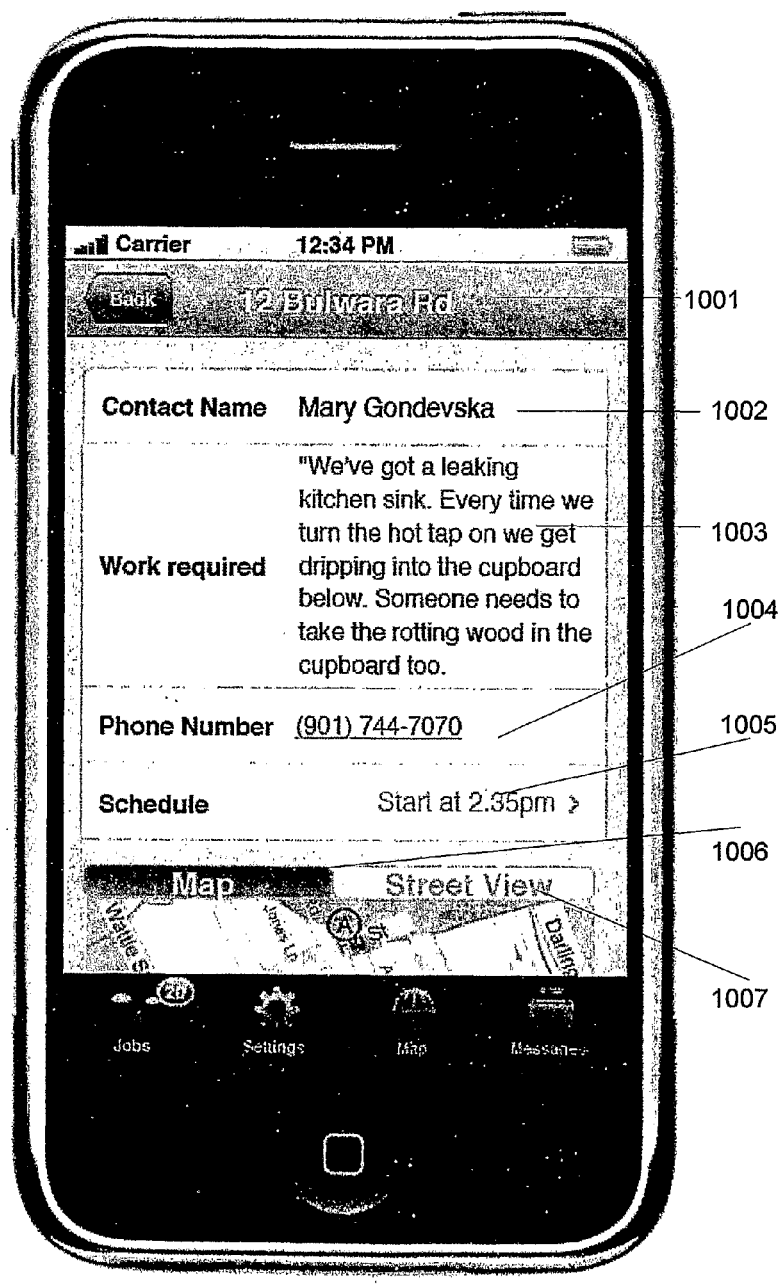

FIG. 10 shows one possible implementation of the graphical interface for displaying more detailed information for a job. This may include information such as a job address 1001, a contact name 1002, a description of work required 1003, a contact phone number 1004 for the job, a scheduled start time and date 1005, a map 1006 showing the job location and possibly the service provider's location if the smartphone is location aware, and a street view 1007 showing a visual representation of the job location.

Figure 11:
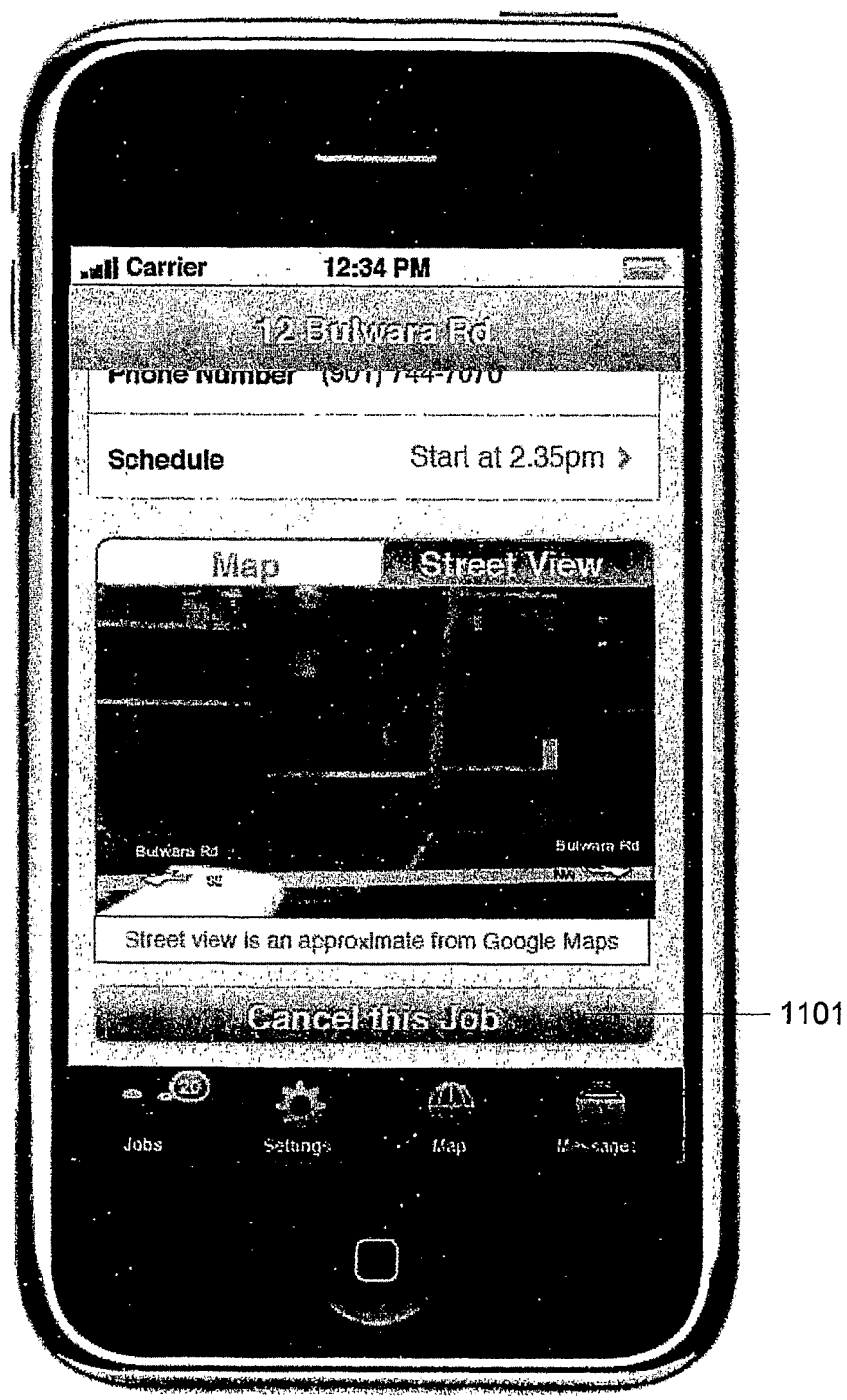

FIG. 11 is a continuation of FIG. 10 showing the lower portion of the interface. This further shows the Cancel button 1101 to cancel this job. Cancelling this job may include phoning the contact phone number for the job, sending a text message or email, or sending a message to the service provider's office.

Figure 12:
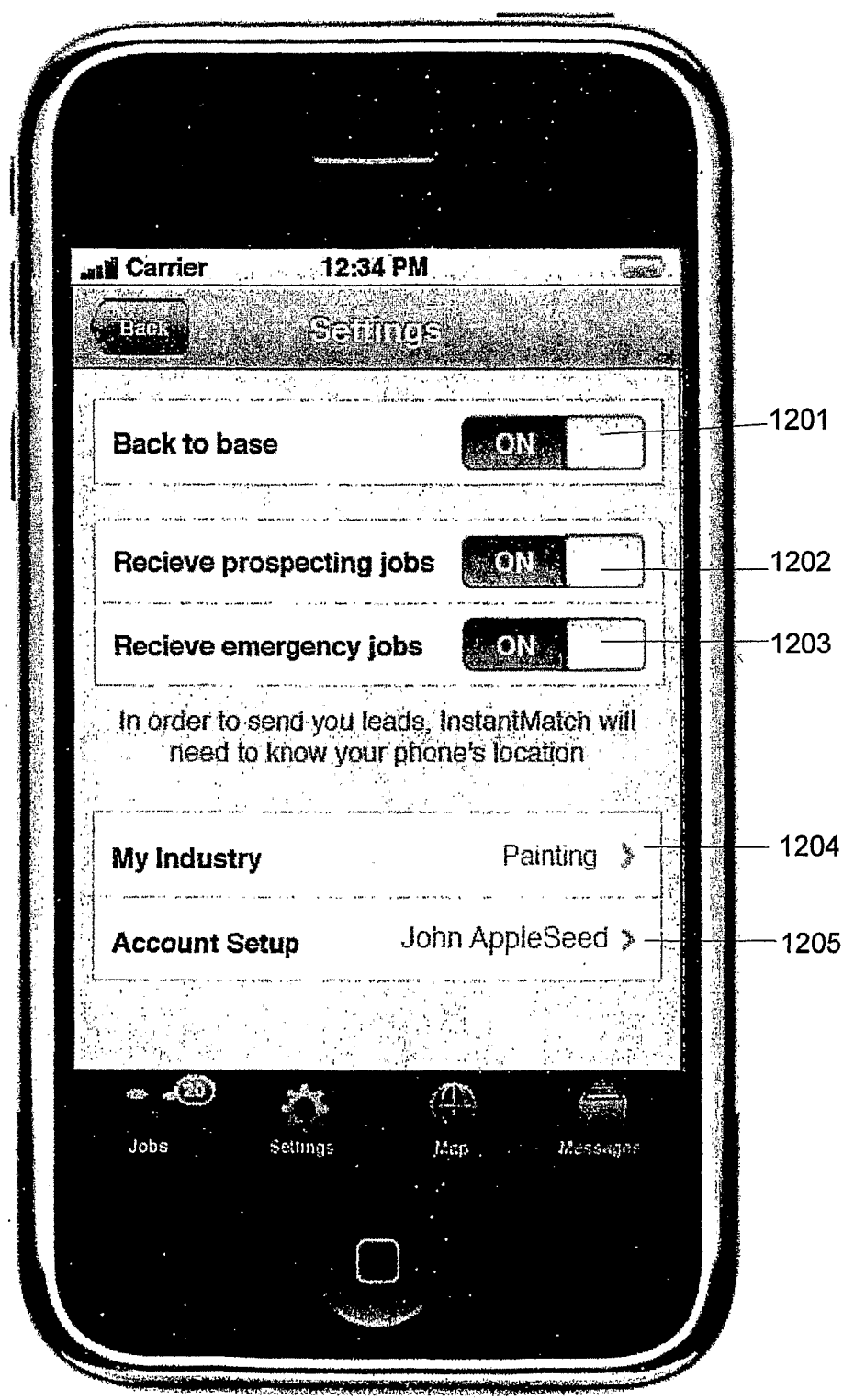

FIG. 12 shows one possible implementation of the graphical interface displayed if a settings icon such as 507 is selected. Various configuration items are included. These settings may be persisted in local storage and may be durable through most phone functions such as going out of service range and restarting the phone. One such item is whether the service provider is out for calls or is returning to base to go off-shift 1201. Another such item is whether the service provider is currently open to receiving prospecting jobs 1202. Another such item is whether the service provider wants to receive emergency jobs 1203. An additional possible item is the service provider's industry 1204. This may be limited to a single vertical or may allow multiple verticals to be selected. The settings page may also provide an interface for adjusting account setup credentials 1205 such as a username and password.

GEO-Aware Lead Management Using Smartphone Client

The foregoing and following embodiments can be implemented on any of various mobile devices, for example Apple's iPhone, or any other geo-aware, Internet connected device such as the Blackberry device or Nokia's N95. On such platforms, the embodiments may be implemented through an internet browser, via a native application, or via an interpreted cross-platform application language such as Java. Personal digital assistants are also contemplated including internet-connected devices such as the Palm Treo 650 and non-networked devices such as the Palm Vx, which can update a local data store via synchronization. Even laptop/desktop computers with a chat client may be used. Particularly suitable devices are those that allow listening processes, i.e., processes that can run in the background so that they are constantly alert for data transmissions from remote systems such as the intermediary computer system.

EXAMPLES

The Problem—A Searcher's Proposition

A searcher is looking for a short-term transactional service, such as plumbing. The searcher is concerned about contacting someone who will do the work at a reasonable price, and is efficient to work with. However since it is a mature market and a commodity transaction, beyond these two factors there typically is little to differentiate most plumbers, except that some are known to be efficient service providers and some are not. With little to differentiate otherwise high quality providers a compare and quote model of selection is ineffective. The searcher is looking for a supplier who (a) meets certain quality standards and is (b) available in a short time frame. In particularly the time-frame constraint (b) becomes a critical factor in an optimal match.

The Problem—Provider's Proposition

The provider is in a short-term transactional trade where he or she is on the road for most (if not all) of the day, such as plumbing. Managing workload is a concern of the provider and achieving margin accretion by optimizing the amount of work his fleet can perform is of key concern. Ideally, the provider is looking to receive (and convert) leads (1) that are local to where the provider presently is or will be, and (2) can be slotted in when the provider is between jobs or when a current job is going slowly.

In an ideal scenario, the provider is receiving a manageable, steady-stream of work throughout the day, from customers in the same region. The provider's objective is to avoid spending time and fuel driving across town. Another objective is for the provider to be able to regulate and act on the stream of leads in a convenient manner.

A Solution

A solution is a lead generation source (or suite of sources) that captures immediate searcher intent (the type of service, a description of the service), the searcher's immediate contact number, and name, are sent to an application installed on the provider's smart phone. The application broadcasts the provider's actual or expected location and intent to a centralized service (intermediary computer system) to allow this to occur. The intermediary computer system service then alerts the provider of a lead.

The system may provide a user interface with an input for the provider to initiate contact with a searcher. The user interface and presented data may provide for any number of means for allowing the provider and searcher to make contact. For example, the intermediary may provide information for provider to contact the searcher directly; it may coordinate and manage the scheduling on behalf of the parties; it may receive a permission from a searcher authorizing the intermediary to provide contact information, following acceptance of a lead by the provider.

The contacts by the provider, searcher or intermediary system (or agents or administrators of the system) may be in any known form, including telephone, email, text message, postal mail, courier, etc. The intermediary may provide a a user interface for the parties to make such contacts, or the intermediary could simply provide a phone number, email or other contact information for a searcher or provider.

In the foregoing embodiments, the provider and searcher profiles may be generated and updated in accordance with the inventive teachings herein related to the use of Buyer Types and Provider Types. Or, the profiles may be generated by any other known conventional or known technique for creating profiles of attributes.

Monetization Events for the Operator of the Intermediary Computer System

There are various way of monetizing leads (any of which may be referred to herein as a "monetization event"), including providing them on a cost-per-lead basis, a subscription basis, a commission basis (e.g., percentage of services). Monetization events might also be structured on multiple bases. For example, there is a first monetization event when the provider receives a lead, a second monetization event if the provider accepts a lead, and a third monetization event if the provider renders services to a searcher. Another possibility is that the leads are provided with a "900" or other revenue generating phone number or email system for contacting the operator of the intermediary computer system or the searcher so that the provider's making of a call (or sending of an email or text message) to the designated number to acquire further information about a lead results in a charge to the provider and revenues for the operator of the intermediary computer system (or some other party involved in the monetization event).

Searcher leads could come from any source, including those described elsewhere herein, such as via the website of the intermediary. In one possible embodiment, the system is coupled to the lead generation system described above using closeness of match to buyer and provider profiles arising from Buyer Types and Provider Types. If there is insufficient matching from that system, or in addition to matching, the leads for a searcher could be offered to provider's participating in the geo-aware management system described above even though those provider's may or may not be participating in the profile matching system.

In some embodiments, the geo-aware applications described above are integrated with a work force management client tool so entities can track and communicate with their distributed workforce via work force management server administered by the entity. There various known GPS-based systems for work force management. The geo-aware application need not communicate directly with the intermediary computer system but may communicate with a work force management server administered by the entity. That server would be in direct communication with the intermediary.

FIGS. 4-12 show some mock-up screenshots of a graphical user interface for a mobile device, in this case an iPhone, storing or executing a mobile application along the lines of certain embodiments described above. In the example presented here, the user of the iPhone application is linked to a corporate account that can distribute and manage work requests through a central office as well as receive ad-hoc leads directly from the intermediary computer system.

Context-Sensitive Profiling and Advertising/Promotion

In certain embodiments, the inventive subject matter is directed to context-sensitive profiling and advertising. In general, this entails use of a library of interactive, online profiling surveys, with particular surveys being automatically selected according to the content on a webpage or other electronic page that is displayed to a searcher on a computing device, including desktop and mobile devices. In a profiling step, searchers visiting a website are presented a survey on a first screen. The survey asks questions that are used to generate or update a searcher profile. The survey is selected from the library based on the context of a webpage or components of a webpage. The user's interaction with components of a webpage may initiate the presentation of a survey, as indicated in the example presented below. The responses are then stored and/or processed for use in matching the searcher to services and/or providers.

In a second step of presenting advertisement or promotions, the response to the survey may be used to generate and present information to a searcher about a goods, services, and/or providers, along with an interface for a user to take action, such as scheduling a visit with a provider or the purchasing of goods or services; learning about special promotions in the area; subscribing to a news or alert service for promotions or special opportunities, particularly those that are based on (1) matching of searcher profiles with provider profiles and/or industry attribute templates, as described elsewhere herein; and (2) geo-awareness of providers so that there is matching of providers and searcher based on current or planned proximity of the searcher to a provider.

In a third step, in response to the searcher's selection of an action, such as "place me in contact with a provider," an outcome of the action may be presented onscreen to the searcher, for example, the time and confirmation of a meeting or a purchase receipt.

The following is a more detailed example of a one possible implementation of the foregoing inventive subject matter.

Screen 1—Profiling Of Searcher

IS THERE A COCKROACH INFESTATION IN YOUR AREA? [Enter your postcode]

Screen 2—Promotion Presented To Searcher for Action

14 PEOPLE REPORTED COCKROACH INFESTATIONS IN THE SURROUNDING AREA LAST MONTH. SHOW HEAT-MAP OF COCKROACH PROJECTS.

Would you like to find cockroach inspectors in your area?. . .

Would you like to be alerted next time there is a cockroach infestation in your area? (What's your email address?)

Screen 3—Outcome of Action Taken By Searcher (either) Complete this form to get quotes from 3 pest inspectors now . . . (or) Thanks, we'll send you a report.

A set of keywords may be associated with a each survey that are relevant to a given survey. For example 'cockroach' associated with 'infestation', 'pest', 'Mortein™' etc. The keywords are associated with a piece of generic publisher content, with existing display advertising, such as:

http://query.nytimes.com/gst/fullpage.html?res= 9D0CE3DF143DF931A25750C0A9679582 60&sec=&spon=& pagewanted=all and for words on the page that map to the keywords set, we create pop-up or roll-over bubbles that appear when the user hovers the mouse over the keyword. There are known technology platforms for creating bubbles with interactive content. One example is found is the Snap Shot™ products of Snap.com (http://www.snap.com/) and another are the in-text contextual advertising products of Kontera (http://www.kontera.com).

In the inventive subject matter, the pop-up or roll-over bubbles provide a container for presenting a relevant survey corresponding to associated content for the user to complete (including possibly submitting a registration page as appropriate). The data input into a bubble is communicated to the intermediary's computer system for storage and/or processing. As used herein, "survey" means a form with one or more questions to be answered by the user by filling in information or selecting from preexisting options presented on the form.

Through completing a survey, the intermediary computer system obtains one or more attributes of information about that user (in the example above, their postcode), which can then be stored against that user's profile. Even if the user is not interested in an immediate transaction with a provider, the survey allows the intermediary to at least begin to build-up or update a profile of that user based on the attributes input by the user. As the user completes more surveys (across different pages or domains), the user's profile becomes progressively richer for all purposes described herein.

The attributes that are collected through the surveys may where possible translate across vertical industries. For example post-code, size of property, if customer is a parent (and at what stage), income, etc., are attributes that should translate across most vertical industries. In another example indicating the value of integrating content an advertising/promotions, a blog directed at lifestyles or 'home' for a specific region or neighborhood could present content in the form of pest infestations in the locality. The data could be presented in graphical form overlaying a map once the user selects their location on the map. The user's interaction results in a text or graphical information showing pest outbreaks in their area. As an example of advertisement or promotion associated with the content, there could be concurrent presentation of a promotion for pest control services. The promotion could also provide that if enough people from the locality sign-up for servicing, a group discount would apply. There could presentation of the current number of people who have signed up for the service. As another example of a promotion, the user's interaction could result in presentation of a competition to win cockroach eradication for their entire street/neighborhood, for example.

In some embodiments of the inventive subject matter, an interest enhancer may be provided to generate user action. For example, the user's interaction with content could result in presentation of an articles indicating that 'block-level eradication' is much more effective/enduring than treating 'local problems' with a 'house-by-house' solution.

The article might include a bubble with maps and coupons offering to notify residents if pest controllers are in the visitors area and offering coupons/discounts, and specifically asking residents to opt-in The system also contemplates a guided exploration of information for searchers to help them make a choice and take an action regarding services that are of potential interest. For example, after initial information is collected from a searcher, a window shows links to other proprietary articles with content correlated to the phrase/word chosen. That way, the user remains on a guided exploration until a point is reached where information gathering and learning leads to action, e.g., fill in a form and ask for quotes for a service.

A guided exploration may generate information that will assist the searcher across categories. For example, if the user expresses interest in fumigation services, a question might be asked that leads to an assessment of whether the interest is a one time interest or whether it relates to a "life event" that is indicative of a possible interest in goods and services across a number of categories. An question might be asked, for instance, is: "have you recently purchased a new home?". If the user answers yes, it can be presumed that the user may be in the market for services across a number of other categories, such as roofing, window cleaning, pool service etc. The user can then be given the opportunity to obtain quotes for services across categories of interest. This can be done through a single browser session or over return visits to a site. The user's profile may be updated with reminders and alerts relating to particular services. For example, promotional offers or reminders may be presented to a home owner in Autumn for gutter cleaning services.

The integration of promotions and advertisements, and surveys may be into content of most any nature. The content may be text, graphical elements, and video (real or animated). In one possible embodiment, a content management system dynamically replaces objects in videos, e.g., adding a logo on a T-Shirt or having words or other features overlaid on the video that invite user interaction. This may be done through known technology like that available from VideoEgg (http://www.videoegg.com). The overlay is typically an "engagement" format in that the user can either do nothing when the overlay appears or may click on it and engage. Once the user engages the overlay, additional content is presented, for example, a video-within-a-video. For example, if somebody is looking at a video called, "Handyman Section: How To Distinguish Between An Ant And A Termite," the user's engagement with an overlay would trigger a survey for profiling user, as described elsewhere herein, and could lead to matches with services providers under the inventive matching system and/or to offerings from service providers based on the inventive location-based applications described elsewhere herein, which are then presented directly to the user. Instead of these possibilities or in addition to them, the user's interactions and profiling could be the basis for lead generations and presentations to service providers based on matching and/or geographical proximity.

In one possible embodiment, there is a profiling step to gauge not only the Buyer Type, but also their affinity to act on a separate project registration form and likelihood of converting the user from that interaction. The affinity of the user to the form is the likelihood of an individual user to be attracted to the proposition presented by the form (e.g., "Get 3 quotes for plumbing") and to complete it. For example, it may be inferred that someone who completed a context-sensitive advertising survey based on associated content in the nature of pest inspection information is probably interested in pest inspection or control services. Therefore, there is probably an affinity for a pest inspection form, and the system will recognize and select that form and present it to the user. The system could start capturing this affinity data not only through the context sensitive profiling, but also through other sources such as the known interne protocol (IP) address of the user, until there is enough data to establish it as likely that there could be a conversion of the user based, for example, on how well a searcher's profile matches historical data from people with similar profile, as described elsewhere herein. The other points may be anything that can be inferred about a user visiting a web page. For example, it is sometimes possible to infer a user's approximate geographic location from the declared IP data of their web browser. The system can then display a form with the additional data needed assign the user to a Buyer Type. The initial profiling thus becomes a means of determining both intent (and, indirectly, yield) and Buyer Type in one efficient process.

The means for evaluating matching profiles and closeness of matches based on weighted attributes is well within the skill of persons in the art. For example, U.S. Pat. No. 6,463,431, which is hereby incorporated by reference in its entirety, discloses a database evaluation system for analysis and exploration of large databases of information through evaluation of utility preferences and nearest neighbor exploration, i.e., closeness of matching. The system provides for domain modeling of various types of information domains using attribute mappings to database fields, and utility value weightings, allowing multiple different domain models to be coupled with a same database of information. This patent also discloses basic hardware and software platforms that may be generally relevant to the inventive subject matter.

Persons skilled in the art will recognize that many modifications and variations are possible in the details, materials, and arrangements of the parts and actions which have been described and illustrated in order to explain the nature of the inventive subject matter, and that such modifications and variations do not depart from the spirit and scope of the teachings and claims contained therein.

All patent and non-patent literature cited herein is hereby incorporated by references in its entirety for all purposes.

The invention claimed is:

1. A computer-implemented method of determining matches between searchers and providers, comprising:
   providing a buyer profile comprising a buyer type for a searcher on a computer;
   providing a plurality of service provider profiles on the computer;
   matching using the computer, one or more service providers based on the buyer type; and
   outputting the matching service providers from the computer,
   wherein each respective service provider profile comprises a number of days since the corresponding service provider was last matched to a searcher and matching service providers is further based on a number of days since the corresponding provider was last matched to a searcher.

2. The method of claim 1 wherein the provided buyer type is based on the searcher's responses to a set of questions adapted to characterize the searcher as one of a plurality of a predetermined buyer types on the computer.

3. The method of claim 1 wherein the matching service providers is further based on feedback following interactions between searchers and service providers.

4. The method of claim 1 wherein the service provider profile comprises a service provider type.

5. The method of claim 4 wherein the matching is based on matching the buyer type to the service provider type.

6. A computer-implemented method of determining matches between searchers and providers, comprising:
   providing a buyer profile comprising a buyer type for a searcher on a computer;
   providing a plurality of service provider profiles on the computer;
   matching using the computer, one or more service providers based on the buyer type; and
   outputting the matching service providers from the computer,
   wherein each respective service provider profile comprises a plurality of weighted attribute values, and
   wherein the matching comprises mapping each buyer type to a plurality of weighted attribute values and one or more weighted attributes have a numerical value within a specified range for the searcher and each respective service provider.

7. The method of claim 3 wherein the feedback is filtered to feedback submitted by feedback parties with the same buyer type as the searcher.

8. The method of claim 1 further comprising:
   using a mobile application to determine a service provider's availability and/or capacity to take additional work within a given time period; and
   matching is based on the service provider's availability and/or capacity to take additional work within a given time period.

9. The method of claim 1 wherein the one or more service providers comprises one or more mobile providers, wherein the outputting comprises notifying the one or more mobile providers of searcher leads in a predetermined proximity of a current position or a planned position of each of the one or more mobile providers.

10. The method of claim 1 wherein the one or more service providers comprises one or more mobile providers, wherein the outputting comprises notifying one or more searchers of the one or more mobile providers in a predetermined proximity based on a current position or a planned position of each of the respective one or more mobile providers.

11. The method of claim 9 wherein the notifications further comprise one or more terms for receiving the lead and further comprising receiving an acceptance of the terms and outputting to the provider contact information for the searcher.

12. The method of claim 11 wherein the terms comprise a fee.

13. The method of claim 12 wherein the fee monotonically increases for each respective service provider that agrees to pay the fee.

14. The method of claim 6 further comprising:
   asking the searcher additional questions;
   refining the weighted attributes to differ from the weighted attributes obtained from mapping the buyer type based on the additional questions.

15. The method of claim 1 wherein the buyer profile further comprises a vertical and matching comprises:
   applying a plurality of matching rules enabled for the vertical, wherein the matching rules include or exclude providers based on the buyer profile;
   ranking providers based on a plurality of ranking rules enabled for the vertical wherein the ranking rules supply a weighted fitness value.

16. The method of claim 6 wherein the provided buyer type is based on the searcher's responses to a set of questions adapted to characterize the searcher as one of a plurality of a predetermined buyer types on the computer.

17. The method of claim 6 wherein the matching service providers is further based on feedback following interactions between searchers and service providers.

18. The method of claim 6 wherein the service provider profile comprises a service provider type.

19. The method of claim 18 wherein the matching is based on matching the buyer type to the service provider type.

20. The method of claim 17 wherein the feedback is filtered to feedback submitted by feedback parties with the same buyer type as the searcher.

21. The method of claim 6 further comprising:
   using a mobile application to determine a service provider's availability and/or capacity to take additional work within a given time period; and matching is based on the service provider's availability and/or capacity to take additional work within a given time period.

22. The method of claim 6 wherein the outputting comprises notifying one or more of the service providers of searcher leads in a predetermined proximity of a current position or a planned position of the one or more of the service providers, respectively.

23. The method of claim 6 wherein the outputting comprises notifying one or more searchers of one or more of the service providers in a predetermined proximity based on a current position or a planned position of the one or more of the service providers, respectively.

24. The method of claim 22 wherein the notifications further comprise one or more terms for receiving the lead and further comprising receiving an acceptance of the terms and outputting to the provider contact information for the searcher.

25. The method of claim 24 wherein the terms comprise a fee.

26. The method of claim 25 wherein the fee monotonically increases for each respective service provider that agrees to pay the fee.

27. The method of claim 6 wherein the buyer profile further comprises a vertical and matching comprises:
applying a plurality of matching rules enabled for the vertical, wherein the matching rules include or exclude providers based on the buyer profile;
ranking providers based on a plurality of ranking rules enabled for the vertical wherein the ranking rules supply a weighted fitness value.

* * * * *